(12) United States Patent
Levitan et al.

(10) Patent No.: US 7,593,834 B2
(45) Date of Patent: Sep. 22, 2009

(54) EXCLUSION OF REGIONS METHOD FOR MULTI-OBJECTIVE OPTIMIZATION

(75) Inventors: Lev Levitan, Moscow (RU); Vladimir Sevastyanov, 1 Pazzi, Irvine, CA (US) 92614

(73) Assignee: Vladimir Sevastyanov

( * ) Notice: Subject to any disclaimer, the term of this patent is extended or adjusted under 35 U.S.C. 154(b) by 723 days.

(21) Appl. No.: 11/116,503

(22) Filed: Apr. 28, 2005

(65) Prior Publication Data

US 2005/0246148 A1 Nov. 3, 2005

Related U.S. Application Data

(60) Provisional application No. 60/567,627, filed on Apr. 30, 2004.

(51) Int. Cl.
*G06F 7/60* (2006.01)
*G05B 13/02* (2006.01)

(52) U.S. Cl. ............................................. 703/2; 700/30
(58) Field of Classification Search ...................... 703/2; 700/28–31, 34
See application file for complete search history.

(56) References Cited

U.S. PATENT DOCUMENTS 7,295,956 B1 * 11/2007 Ruetsch ......................... 703/2

2002/0015051 A1 * 2/2002 Sevastyanov ................ 345/643
2005/0187849 A1 * 8/2005 Bollapragada et al. ........ 705/36

* cited by examiner

*Primary Examiner*—Paul L Rodriguez
*Assistant Examiner*—Nithya Janakiraman
(74) *Attorney, Agent, or Firm*—Leonard Tachner

(57) ABSTRACT

The Exclusion of Regions Method (TERM) and Concurrent Gradients Method (CGM) for multi-objective optimization of objective functions considered in a multi-dimensional domain are provided. TERM decomposes the domain into a set of non-intersecting sub-regions, and applies a special criterion to each sub-region to determine if it does not contain Pareto-points. Non-prospective sub-regions are filtered out, while prospective ones are used for generating points-candidates, and their improvement by a recursive procedure until pre-assigned accuracy is achieved. CGM works as any gradient-based algorithm. But on each step CGM determines the area of simultaneous objective functions improvement and a direction for the next step in this area. The area is determined in a simple way based on gradients for each objective function calculated on current point. This introduces new a type of numerical analysis in the multi-objective optimization theory, and allows developing extremely efficient optimization algorithms without using the scalarization technique or any kind of heuristic.

22 Claims, 21 Drawing Sheets

EXCLUSION OF REGIONS METHOD FOR MULTI-OBJECTIVE OPTIMIZATION

CROSS-RELATED APPLICATIONS

This application claims priority from Provisional Patent Application Ser. No. 60/567,627 filed Apr. 30, 2004.

BACKGROUND OF THE INVENTION

1. Field of the Invention

The present invention relates to the field of multi-objective optimization methods, and especially to methods of solving large-scale design optimization tasks.

2. Description of the Prior Art

Optimization methods started with Newton's method, which was described by Isaac Newton in "De Analysi Per Aequationes Numero Terminorum Infinitas," written in 1669. Since then a lot of methods for optimization of functions have been developed and applied for solving a variety of technical and scientific problems. Modern applied mathematics includes a large collection of optimization methods created over three centuries. An important group of such methods is based on using $1^{st}$ and $2^{nd}$ order derivatives of objective function [5, 6, 7] (Newton-Ralphson, Steepest descent, Conjugate gradient, Sequential quadratic programming, et cetera).

Italian economist Vilfredo Pareto introduced the concept of Pareto optimality in 1906 (see related definitions and multi-objective optimization problem formulation in p.A.1.) The concept has broad applications in economics and engineering. The Pareto optimality concept became the starting point for a new discipline of multi-objective optimization, which is intended to find trade-offs for several contradicting objectives. For instance, survivability and cost are contradicting objectives in ship design. If survivability is improved then cost may become too high. If the cost is decreased then survivability may become worse. It is important to find a reasonable trade-off for these two objectives, which determines the practical value of the multi-objective optimization concept.

The general multi-objective optimization problem is posed as follows [1]:

$$\text{Minimize}_X: F(X)=[F_1(X),F_2(X),\ldots,F_m(X)]^T \quad (1)$$

$$\text{subject: } q_j(X) \leq 0; j=1,2,\ldots k$$

Here is a particular sample of a small optimization task with two independent variables and two objective functions:

$$\text{Minimize: } F1=1-\exp[-(x1-1/\sqrt{2})^2-(x2-1/\sqrt{2})^2]; \quad (2)$$

$$\text{Minimize: } F2=1-\exp[-(x1-1/\sqrt{2})^2-(x2-1/\sqrt{2})^2];$$

$$-4 \leq x1, x2 \leq 4;$$

Dimension of multi-objective optimization tasks can be very different from two-dimensional tasks like the task (2) to large-scale tasks with dozens of objective functions and thousands of independent variables typical for aerospace, automotive industries, ship design, et cetera. Today it is impossible to design an airplane, automobile, or ship without intensive use of multi-objective optimization algorithms. This determines market demand and practical value of efficient multi-objective optimization algorithms.

There are no numerical methods developed for solving multi-objective optimization tasks. So, first attempts to solve such tasks were based on using well developed for the moment gradient-based optimization methods. In order to use those single-objective methods for multi-objective optimization a scalarization technique has been developed, which allowed substitution of multiple objective functions by a weighted exponential sum of those functions. The following is the simplest and the most common form of scalarization for the optimization problem (3):

$$U = \sum_{i=1}^{m} w_i [F_i(x)]^p; F_i(x) > 0; \forall i \quad (3)$$

In the early 1970's John Holland invented Genetic Algorithms (GAs). A genetic algorithm is a heuristic used to find approximate solutions to difficult-to-solve problems through application of the principles of evolutionary biology to optimization theory and other fields of computer science. Genetic algorithms use biologically derived techniques such as inheritance, mutation, natural selection, and crossover. GAs differs from conventional optimization algorithms in several fundamental respects. They do not use derivative or gradient information, but instead rely on the observed performance of evaluated solutions, and the transition rules are probabilistic rather than deterministic.

Thus, there are two groups of known multi-objective optimization methods: scalarization methods and multi-objective genetic algorithms.

1. Scalarization methods use a global criterion to combine multiple objective functions mathematically. These methods require solving a sequence of single-objective problems. The most common method of the group is weighted sum method. The method has several serious problems:

a. Use of gradients for determination of direction for the next step works perfectly when a single objective function is optimized. But utilizing the same technique for a weighted sum of multiple objective functions does not allow controlling values of individual objective functions during the optimization process. It creates serious problems finding evenly distributed Pareto optimal points:

It is impossible to obtain points on non-convex portions of the Pareto optimal set in the objective function space [1]. This is important because the best trade-off solution can be lost there. See FIG. 1a with Pareto-optimal points found by a gradient-based method for a task with non-convex Pareto frontier. All found Pareto points are concentrated in the areas of best and worse objective functions' values. Non-convex part of the Pareto frontier is empty;

Uniform distribution of Pareto optimal points cannot be guaranteed even if the weights are varying consistently and continuously. It means that Pareto set will be incomplete and inaccurate [2]. This leads to the situation when the best optimal design solution is missed;

b. Methods are based upon usage of a priori articulation of preferences for determining weights in the weighted sum. However, a satisfactory a priori selection of weights does not necessarily guarantee that the final solution will be acceptable;

c. Mixed discrete and continuous problems cannot be solved by derivative based optimization methods. Any real life design problem naturally has discrete or integer design parameters. Substitution of discrete parameters by continuous ones compromises accuracy of the optimization result significantly.

2. Multi-objective Genetic Algorithms combine the use of random numbers and information from previous iterations to evaluate and improve a population of points rather than a single point at a time. GAs are based on heuristic strategies not related to the nature of multi-objective optimization. As a result, GAs are:

a. Computationally extremely intensive and resource consuming;

b. Do not provide adequate accuracy. See FIG. 1c with Pareto-optimal points found by one of Genetic Algorithms. The algorithm was not able to find points located closer to the true solution, which is the diagonal of the x1-x2 diagram;

c. Do not provide an objective measure to evaluate divergence of found solutions from true Pareto frontier;

d. The objective of GAs is to find the optimal solution to a problem. However, because GAs are heuristics, the solution found is not always guaranteed to be the optimal solution. See a sample on FIG. 1c.

Traditional gradient-based optimization methods are designed to solve single-objective optimization tasks. Absence of numerical methods designed specifically for multi-objective optimization, forced engineers to invent an artificial scalarization technique, which allows considering multi-objective optimization tasks as single-objective ones, and using gradient-based methods.

For the same reason, engineers started utilizing heuristic GAs for multi-objective optimization. Both approaches are not designed to solve multi-objective optimization tasks and do not have appropriate mathematical foundation, and as result have above listed disadvantages.

Our invention offers new a type of numerical analysis specifically targeted to solve multi-objective optimization tasks. It is based on mathematically proven results (see Appendix A) and intended to overcome disadvantages of existent approaches.

1. Andersson J., "A Survey of Multi-objective Optimization in Engineering Design," Fluid and Mechanical Engineering Systems, Linköping University, Sweden, LiTH-IKP-R1097.

2. Marler, R. T., and Arora, J. S. (2004), "Survey of Multi-objective Optimization Methods for Engineering", Structural and Multidisciplinary Optimization, 26, 6, 369-395.

3. Pareto, V. 1906: Manuale di Economica Politica, Societa Editrice Libraria. Milan; translated into English by A. S. Schwier as Manual of Political Economy. Edited by A. S. Schwier and A. N. Page, 1971. New York: A. M. Kelley.

4. Holland, J. H. (1975). Adaptation in Natural and Artificial Systems. University of Michigan Press: Ann Arbor, Mich.

5. Vanderplaats, G. N., Numerical Optimization Techniques for Engineering Design, McGraw-Hill Book Co., 1984.

6. Haftka, R. T., and Gurdal, Z., Elements of Structural Optimization, Kluwer Academic Publishers, 1992.

7. Walsh, G. R., Methods of Optimization, John Wiley, 1975.

SUMMARY OF THE INVENTION

The Exclusion of Regions Method (TERM) for multi-objective optimization of objective functions considered in a multi-dimensional domain is provided. The principal approach is to decompose the domain into a set of sub-regions, and apply a special criterion to each sub-region to determine if it does not contain Pareto-points. Non-prospective sub-regions are filtered out, while prospective ones are used for generating points-candidates, and they are improved by a procedure until a pre-assigned accuracy is achieved.

In accordance with the present invention, a multi-objective optimization system and method are provided that substantially eliminate or reduce disadvantages of previously developed multi-objective optimization tools.

Accordingly, this invention provides a numerical method of multi-objective optimization for objective functions considered in a multidimensional domain. The method includes two stages: decomposition and improvement. Decomposition is targeted to filter out the sub-regions not containing any solutions, and find in such a way prospective sub-regions for further search. On the improvement stage points-candidates are generated in the prospective sub-regions, and improved by a special iterative procedure until pre-assigned accuracy has been achieved. In this way unnecessary searching in wrong sub-regions is avoided and computational time is reduced. An important feature of the numerical method is ability to find sub-regions containing true Pareto points at the end of calculations. The size of such sub-regions is determined by the pre-assigned accuracy. If higher accuracy is required then found sub-regions are smaller and found solutions are closer to the true Pareto frontier.

Another object of invention is a set of criteria allowing one to determine whether a sub-region does not contain Pareto solutions, and excluding it from further consideration.

Other objects of invention are Decomposition and Simplex Improvement algorithms allowing one to find solutions with pre-assigned accuracy. These two improvement algorithms are pure search algorithms.

TERM algorithm in conjunction with Decomposition and Simplex Improvement algorithms allow finding Pareto optimal points with pre-assigned accuracy. It does not have any problems in finding non-convex parts of Pareto frontier (see FIG. 1d.) TERM also supports working with mixed independent variables. See FIG. 2 that illustrates a solution for the following problem with mixture of continuous and discrete design variables:

$$\text{Maximize: } F1=3-(1+x3)*\cos(x1*3.14/2)*\cos(x2*3.14/2); \tag{4}$$

$$\text{Maximize: } F2=3-(1+x3)*\cos(x1*3.14/2)*\sin(x2*3.14/2);$$

$$\text{Maximize: } F3=3-(1+x3)*\cos(x1*3.14/2)*\sin(x1*3.14/2);$$

$$0 \leq x1, x2 \leq 1; x3 \in \{0.1, 0.3, 0.5, 0.7, 0.9\};$$

Another object of invention is Concurrent Gradients Method (CGM) for multi-objective optimization. CGM is based on gradient values, and can be used as an improvement algorithm in conjunction with the TERM algorithm, and as an independent algorithm of multi-objective optimization as well.

CGM is a generalization of the gradient-based approach for multi-objective optimization. Basically, it works as any gradient-based algorithm, but on each step CGM determines the area of simultaneous objective functions improvement and a direction for the next step in this area. The area is determined in a simple way based on gradients for each objective function calculated on current point. This introduces new a type of numerical analysis in the multi-objective optimization theory, and allows developing extremely efficient optimization algorithms without using the scalarization technique or any kind of heuristic.

According to CGM, a step cannot be done in a direction that improves some objective functions and makes other ones worse. No objective function gets worse on the next step. This is the main difference and a big advantage compared with traditional gradient-based algorithms, which ignore current value of each objective function, and improve just their weighted sum. This allows significant reduction in the iterations number until an optimal point will be found, and improves quality of results. See FIG. 1c with Pareto-optimal points found by CGM method. The points are evenly spread and cover the entire Pareto frontier, which confirms high quality and accuracy of the solution.

Evaluation of computational efficiency has been performed for the CGM algorithm. On average, CGM has approximately the same efficiency as traditional gradient-based optimization algorithms. For some tasks CGM is 2-5 times faster than traditional algorithms. For other tasks CGM is 2-5 times slower. Efficiency of the CGM algorithm has been evaluated also for large-scale optimization tasks with 1000-2000 independent variables, and it was 1.5-4 times faster than traditional gradient-based optimization methods on a few considered tasks.

As mentioned earlier, CGM is a gradient-based method, which allows using so-called Response Surface Method (RSM) that is widely used in conjunction with traditional gradient-based algorithms. RSM builds local approximations of objective functions and uses them for calculating of gradients and even making a few steps without evaluation of the objective functions. This allows reducing the number of objective functions evaluations hundreds and thousands times, and makes CGM capable of solving the most challenging optimization tasks in aerospace, automotive, et cetera industries. CGM+RSM is at least as efficient as the fastest traditional gradient-based algorithms using the same RSM technique, and in many cases it is even more computationally efficient.

Employing the RSM technique gives CGM a huge advantage in computational efficiency compared with GAs because GAs do not use gradients, and as result, are not able to use the RSM technique. It means that CGM+RSM is hundreds and thousands times faster compared to GAs.

CGM is at the start point of its development while traditional gradient-based optimization algorithms have a long history of continuous efforts to improve their computational efficiency. We believe that CGM will become the fastest multi-objective optimization algorithm in the short term, and the number one choice for the most challenging design optimization tasks in aerospace, automotive, ship design, et cetera industries.

Another object of invention is a hybrid of multi-objective and single-objective optimization. On the first stage it uses the TERM algorithm for determination of initial points. Each found initial point has own sub-region around it, which includes true Pareto optimal solutions localized in such a way with pre-assigned accuracy (see mathematical proof in the Appendix A.) On the second stage it starts a gradient-based single-objective optimization algorithm from each initial point and performs a search inside of its small sub-region. FIG. 1a illustrates inability of gradient-based algorithms relying on scalarization technique to find non-convex parts of Pareto frontier, while FIG. 1b shows the correct results found by the hybrid algorithm.

The inventors hereof have developed The Exclusion of Regions Method (TERM) and Concurrent Gradients Method (CGM) for multi-objective optimization. TERM and CGM provide all above features.

Still further objects and advantages will become apparent from a consideration of the ensuing description and accompanying drawings.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE PREFERRED EMBODIMENT

General Description of the Exclusion of Regions Method

Figure 1A:
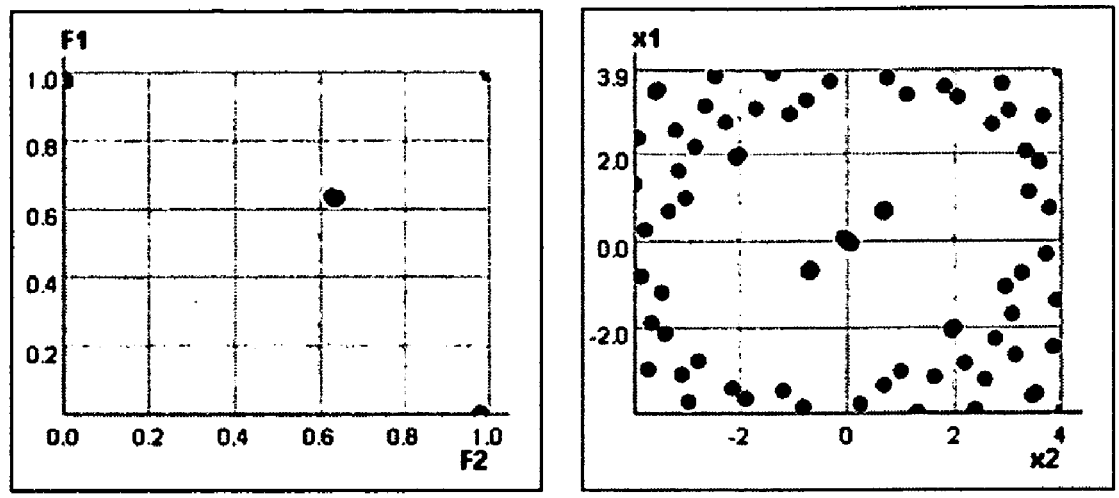
FIG. 1a illustrates the inability of gradient methods relying on a scalarization technique to find points of a non-convex part of Pareto front for the task (2)
Figure 1B:
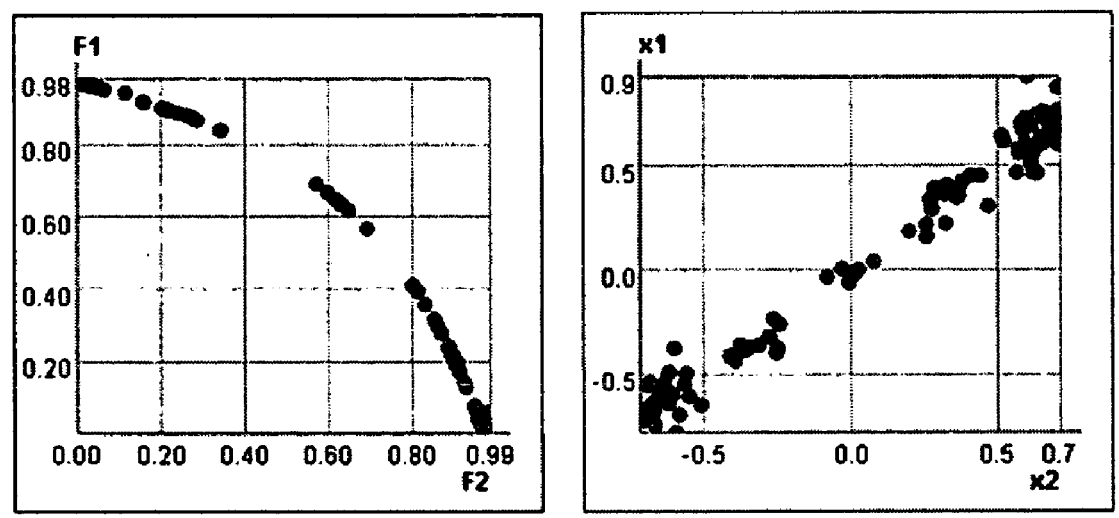
FIG. 1b shows the solution found by a hybrid method, which determined initial points by TERM algorithm and then improves them by a traditional gradient method.
Figure 1C:
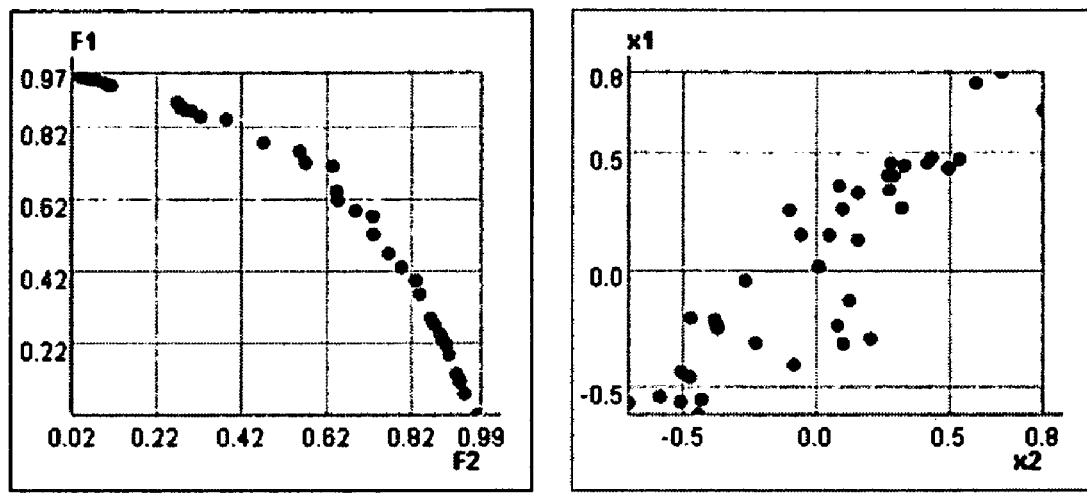
FIG. 1c shows the solution found by an evolutionary algorithm named Fair Evolutionary Multi-Objective Optimizer (FEMO.) FEMO is not able to improve accuracy of the solution.
Figure 1D:
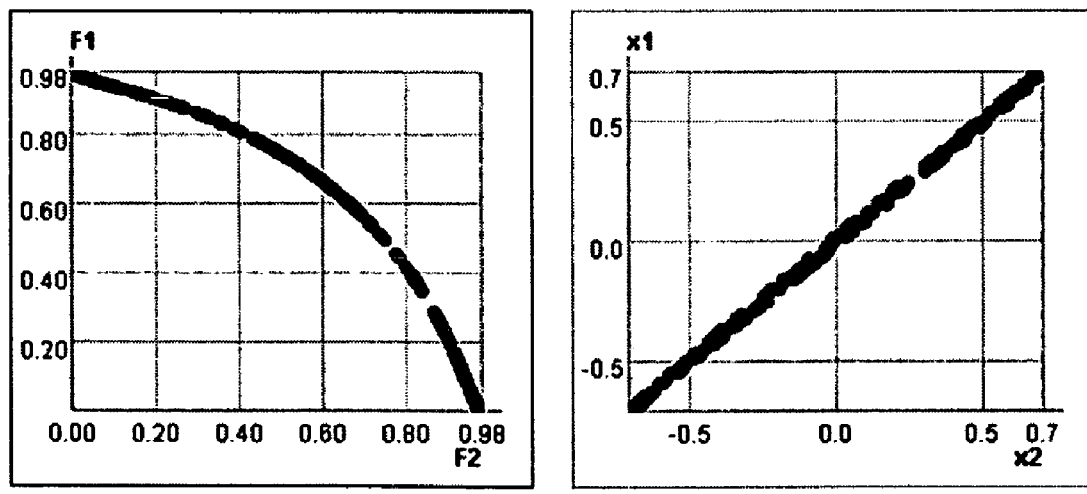
FIG. 1d shows an accurate solution found by Concurrent Gradients method; Simplex Improvement algorithm and Decomposition Improvement algorithm give similar pictures, but require more significant computational time, FIG. 2, comprising
Figure 2A:
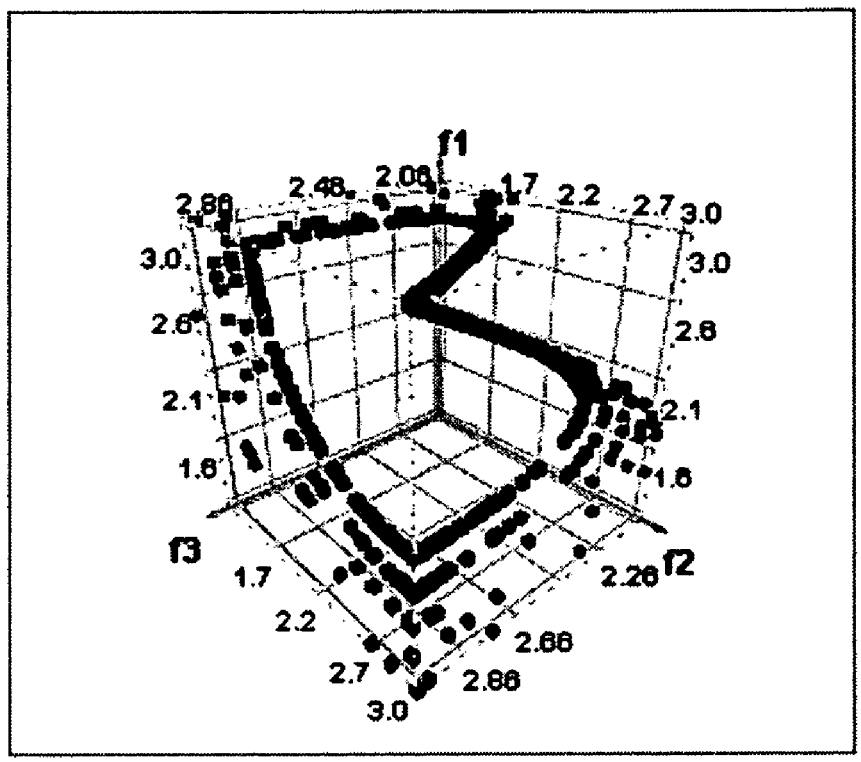
FIGS. 2a and 2b, illustrates a solution found by the TERM algorithm for the multi-objective optimization task (4) with a mixture of continuous and discrete independent variables.
Figure 2B:
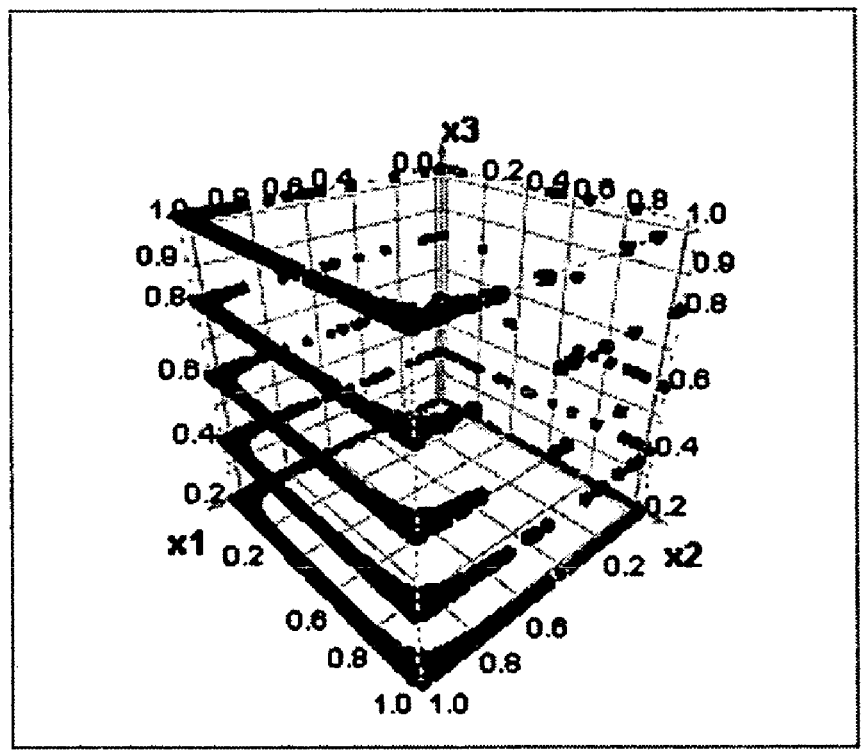
Figure 3:
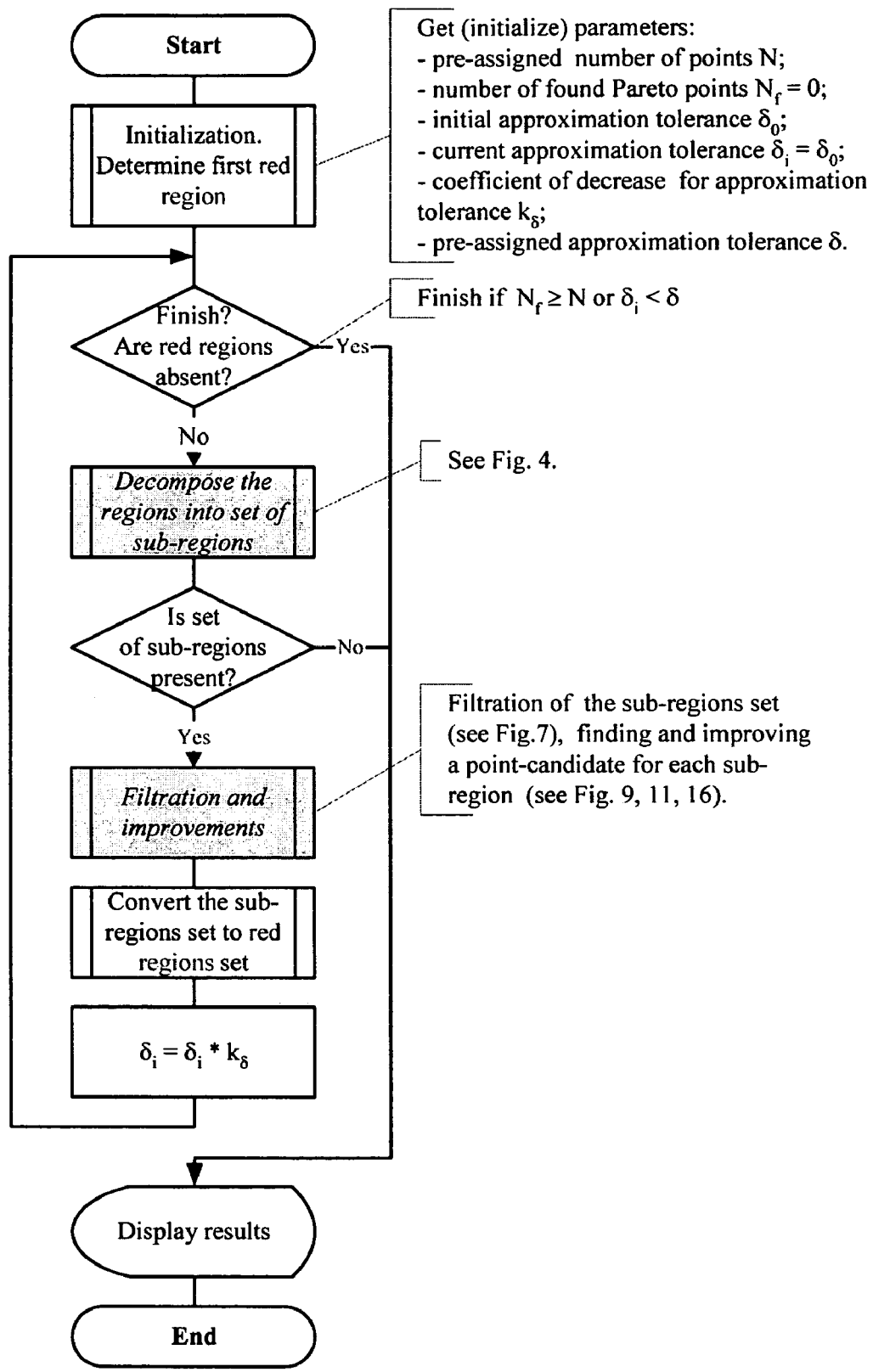
FIG. 3 is a flow diagram of the general schema of TERM algorithm.

The Exclusion of Regions Method (TERM) for multi-objective optimization consists of two main steps: decomposition to find prospective initial regions, and improvement of the points taken in initial regions. Decomposition algorithm finds in design space a set of so-called "red" n-dimensional sub-regions that are likely to contain Pareto points. Then on the improvement stage a point from each "red" sub-region is improved by special iterative procedure until pre-assigned approximation tolerance δ is achieved. Obtained set of points is filtered and output (see FIG. 3).

Let us consider the decomposition algorithm in details.

1. First "red" sub-region is equal to the domain that is determined by user in the task formulation. It can be described by the following inequalities:

$$x_{l_i} \leq x_i \leq x_{u_i}, \text{ where } i=1,\ldots,n. \quad (5)$$

2. Then Lipschitz constants are calculated for the base "red" region.

3. Lipschitz constants and current objective functions tolerances $\delta_i$ are used for creating core sub-regions. The base core sub-region with core point $X^0=\{x_1,\ldots,x_n\}$ has the following bounds:

$$x_{l_i}^0 \leq x_i \leq x_{u_i}^0, \quad (6)$$

where $i=1,\ldots,n$, $x_{l_i} \leq x_{l_i}^0$ and $x_{u_i}^0 \leq x_{u_i}$.

4. The base core sub-region is utilized for decomposing base region into a set of sub-regions of $2^{nd}$ order. Each sub-region of $2^{nd}$ order has own core region and is decomposed to set of $3^{rd}$ order, et cetera. The sub-region not decomposed if its own core region size is equal to the region size.

5. The set of created sub-regions is divided into two categories: "blue" and "red".

6. The set of "blue" sub-regions is excluded from further consideration.

7. An initial point is selected in each "red" sub-region.

8. Each selected initial point is improved by an improvement method.

9. The points obtained after improvement process are compared with respect to pre-assigned accuracy coefficients in order to filter out non-Pareto points.

10. The rest of points are declared as approximate Pareto points, or multi-objective optimization results.

11. Current values of objective functions tolerances $\delta_i$ are decreased. Continue from step 3 if further optimization is needed.

12. Output optimization results.

Decomposition

Decomposition is targeted to decompose the design space into a set of sub-regions, recognize and filter out the sub-regions not containing any solutions, and find in such a way prospective sub-regions for further search.

Major part of the decomposition algorithm is creating core region according to current tolerance coefficients, which are calculated using Lipschitz constants. Let us consider in detail the evaluation of Lipschitz constants, tolerance coefficients, and partial derivatives at an arbitrary point and at a core point.

Evaluation of partial derivatives at the point $X^0=\{x_1^0,\ldots,x_n^0\}$ for objective functions $F_1,\ldots,F_m$:

$$\frac{\partial F_j}{\partial x_i} = \frac{F_j(x_1^0,\ldots,x_i^0+\Delta x_i,\ldots,x_n^0)-F_j(x_1^0,\ldots,x_n^0)}{\Delta x_i}, \quad (7)$$

where $i = 1\ldots n, j = 1\ldots m,$ $\Delta x_i = \dfrac{x_{ui}-x_{li}}{K}, K \to \infty.$ Current objective functions tolerances are calculated based on objective functions values on N arbitrary points:

$$\Delta F_j = |(\max F_j(x_1^k,\ldots,x_n^k) - \min F_j(x_1^k,\ldots,x_n^k)) \cdot \delta_i|, \quad (8)$$

Where $k=1\ldots N, j=1\ldots m,$ $\delta_i$ is current approximation tolerance.

Current objective functions tolerances $\Delta F_j$ are used to create a core region for the core point $X^0=\{x_1^{0'},\ldots,x_n^0\}$:

$x_{l_i}^0 = \max\{x_i^0 - hx_i, x_{l_i}\},$ $x_{u_i}^0 = \min\{x_i^0 + hx_i, x_{u_i}\},$ $$\text{Where } i=1\ldots n, hx_i = \left|\frac{\min \Delta F_j}{Cz \cdot \max \frac{\partial F_j}{\partial x_i}}\right|, j=1\ldots m, \quad (9)$$

$Cz \leq 1$ – Safety factor.

Figure 4:
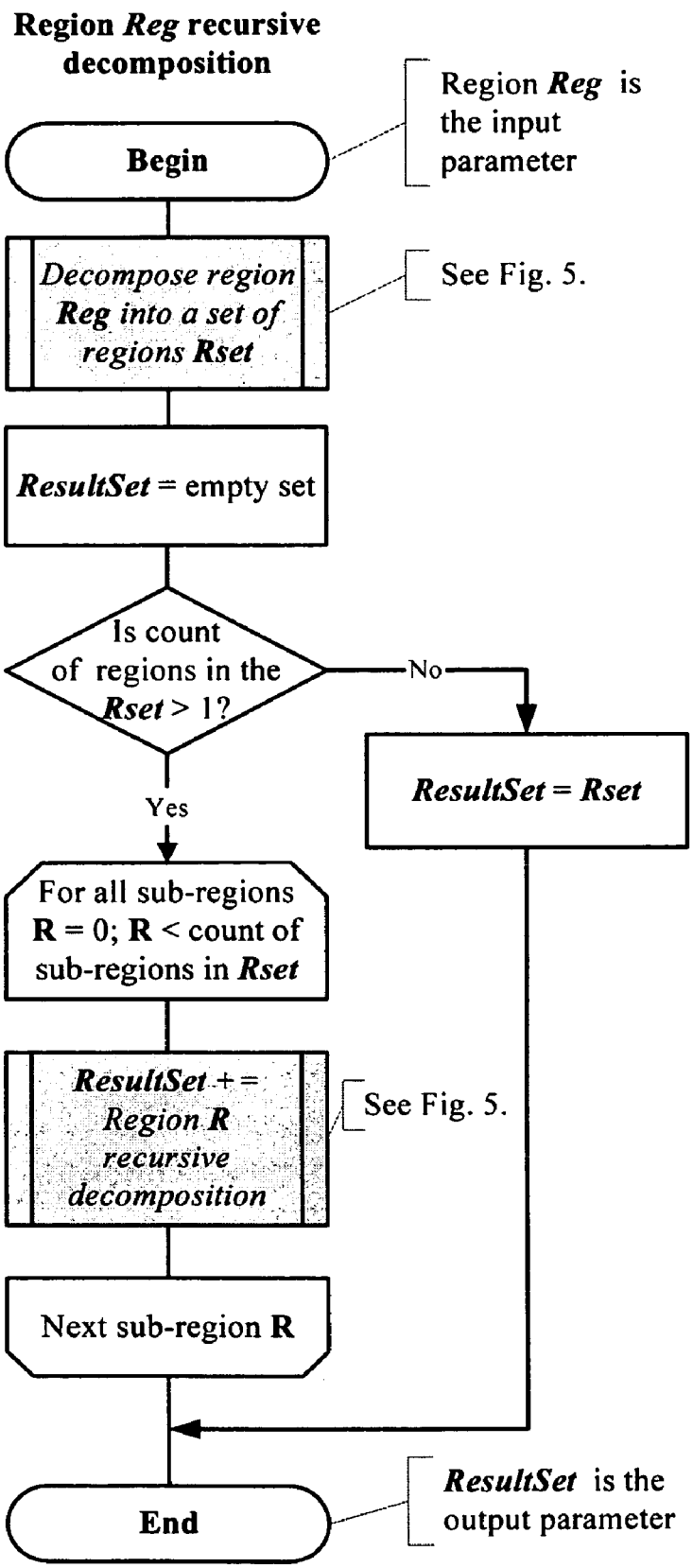
FIG. 4 is a flow diagram of a general schema of region decomposition.
Figure 5:
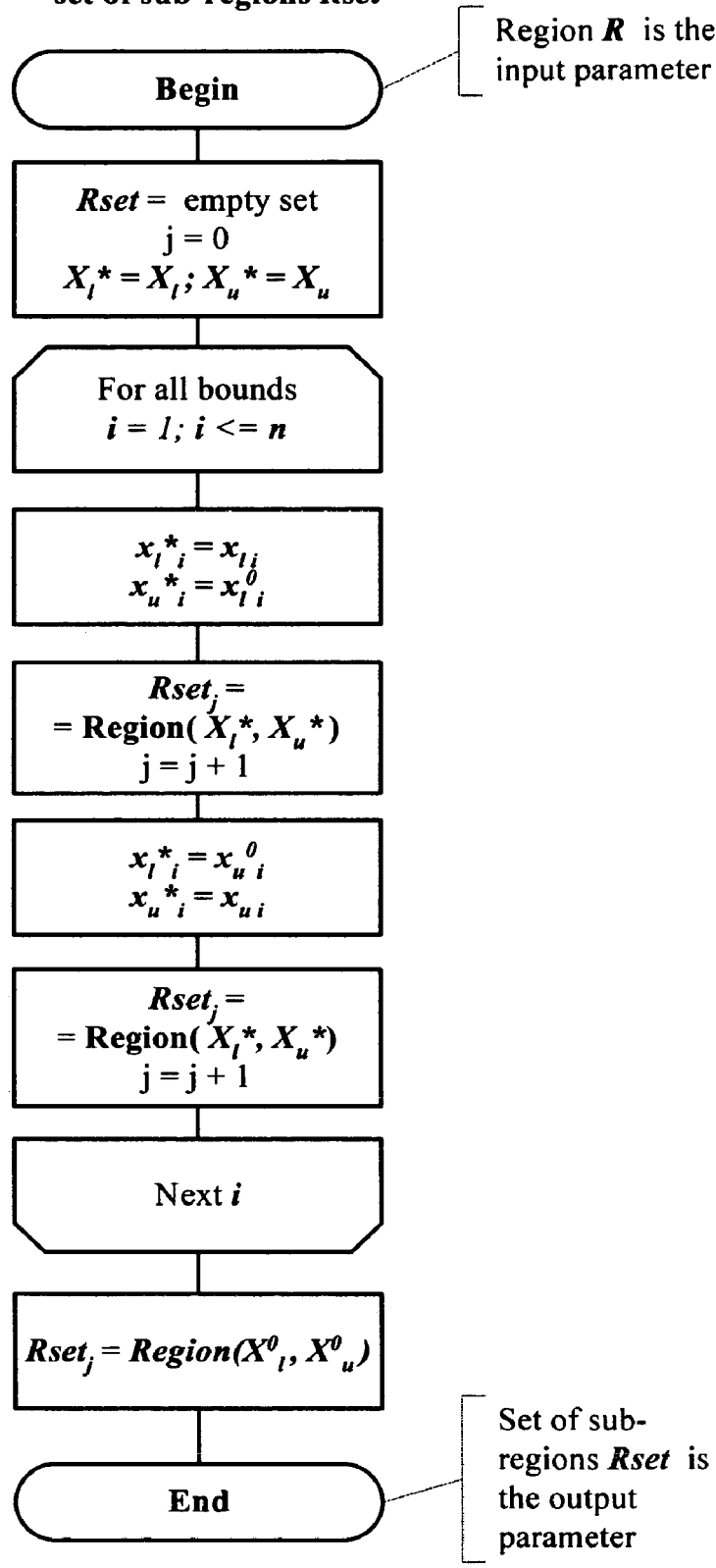
FIG. 5 is a flow diagram of a schema of region decomposition into a set of sub-regions.

FIG. 4 illustrates a general schema of region decomposition after determining the core region bounds. The main decomposition algorithm uses a recursive procedure to decompose a region into a set of sub-regions (see FIG. 5 for details).

Figure 6A:
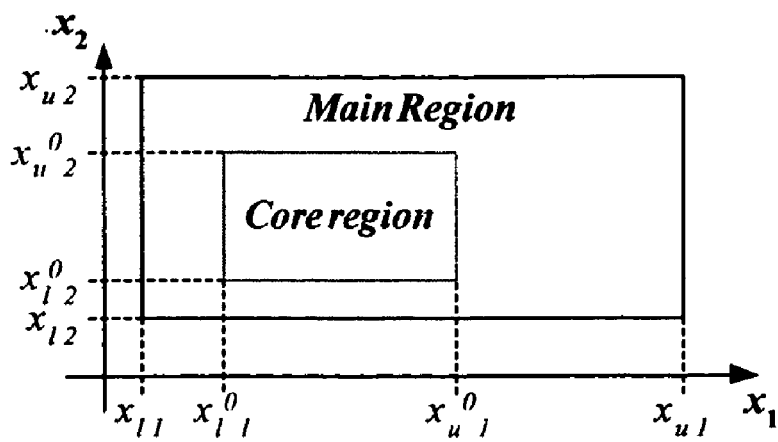
FIG. 6a is a graph showing the creation of a core region in the decomposition process.
Figure 6B:
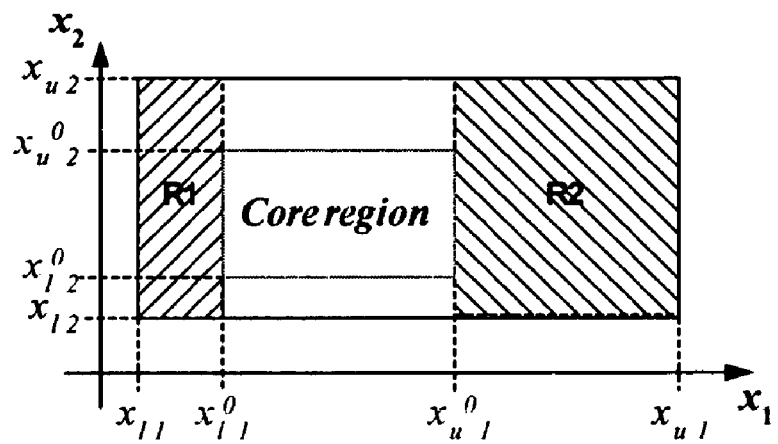
FIG. 6b is a graph illustrating decomposition on the variable $x_1$.
Figure 6C:
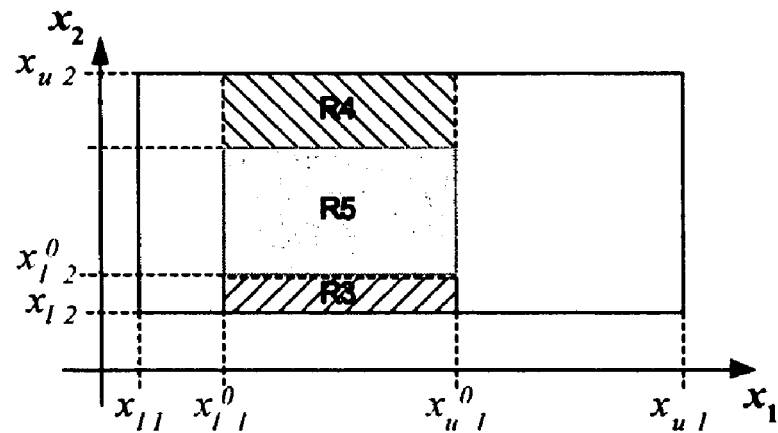
FIG. 6c is a graph illustrating decomposition on the variable $x_2$.

For better understanding of the decomposition algorithm a sample of an optimization task with two independent variables $x_1$ and $x_2$ is illustrated in FIG. 6: creating a core region (FIG. 6a), and also decomposing of sub-regions along the variables $x_1$ (FIG. 6b) and $x_2$ (FIG. 6c).

FIG. 6 illustrates a single iteration of recursive decomposition process. Five sub-regions have been decomposed during the iteration:

1 sub-region: $x_{l_1} \leq x_1 \leq x_{l_1}^0$, $x_{l_2} \leq x_2 \leq x_{u_2}$;
2 sub-region: $x_{u_1}^0 \leq x_1 \leq x_{u_1}$, $x_{l_2} \leq x_2 \leq x_{u_2}$;
3 sub-region: $x_{l_1}^0 \leq x_1 \leq x_{u_1}^0$, $x_{l_2} \leq x_2 \leq x_{l_2}^0$;
4 sub-region: $x_{l_1}^0 \leq x_1 \leq x_{u_1}^0$, $x_{u_2}^0 \leq x_2 \leq x_{u_2}$;
5 sub-region: $x_{l_1}^0 \leq x_1 \leq x_{u_1}^0$, $x_{l_2}^0 \leq x_2 \leq x_{u_2}^0$.

In the next step of decomposition, sub-region 5 will not be decomposed further because the core region covers the entire sub-region 5. For all other sub-regions it is necessary to:

Take an arbitrary core point;
Create a core region in the current sub-region;
Repeat all steps of the decomposition process described above.

Filtration of Sub-Regions and Points-Candidates

The filtration procedure is intended to separate "blue" and "red" sub-regions.

According to the criteria 1)-3) (see Numerical Solution with Pre-assigned Accuracy, section A.1), "blue" sub-regions do not contain any solutions, and they are excluded from further consideration. Each "red" sub-region will be processed by an improvement algorithm, and a point-candidate will be found in the sub-region.

Size of each sub-region is limited by current objective functions tolerance $\Delta F_j$, j=1 . . . m. It allows use of $\Delta F_j$ for comparing core points against each other, which simplifies the sub-region filtration procedure.

Figure 7:
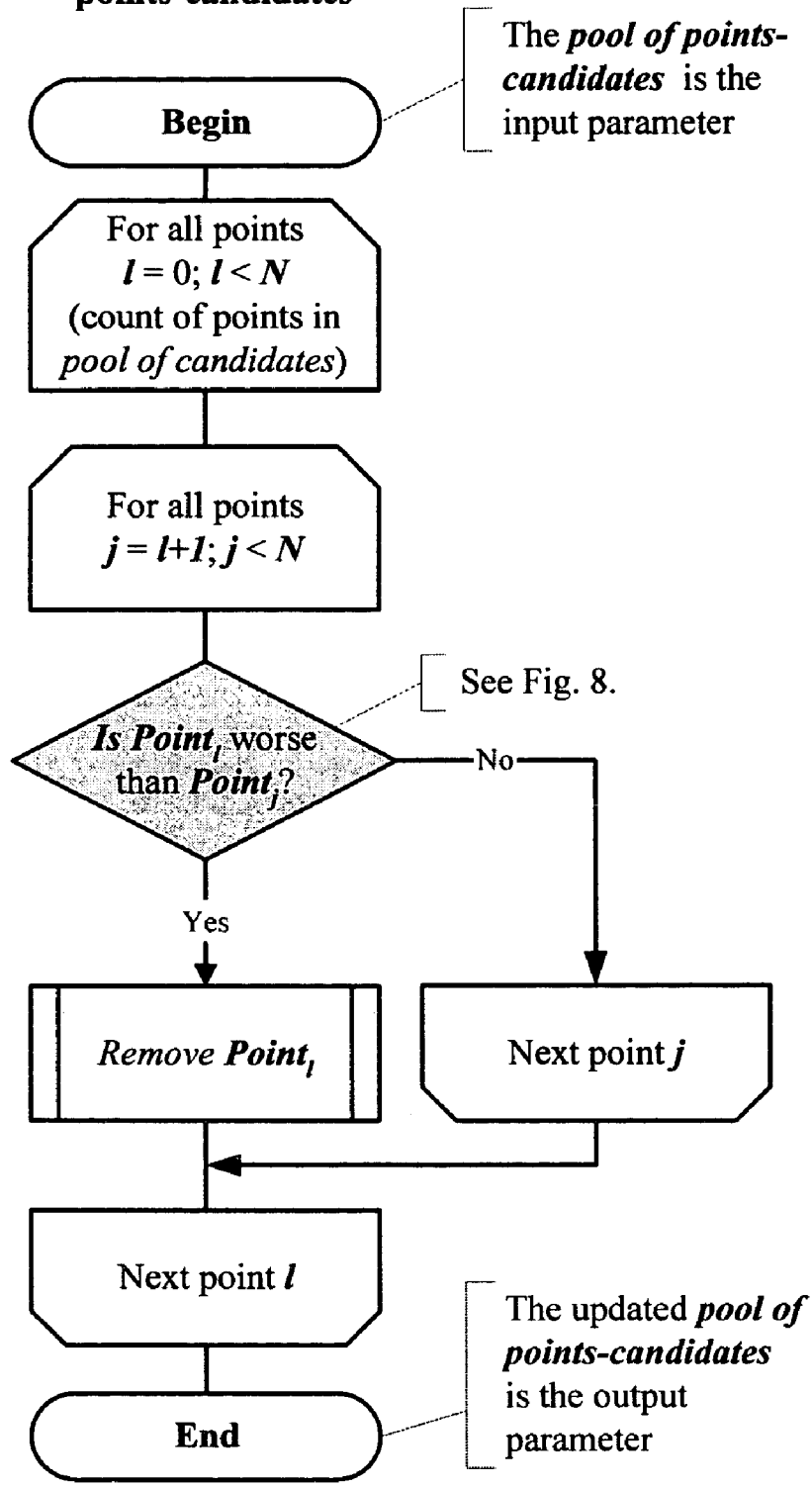
FIG. 7 is a flow chart of filtration non-Pareto points from the pool of points-candidates.
Figure 8:
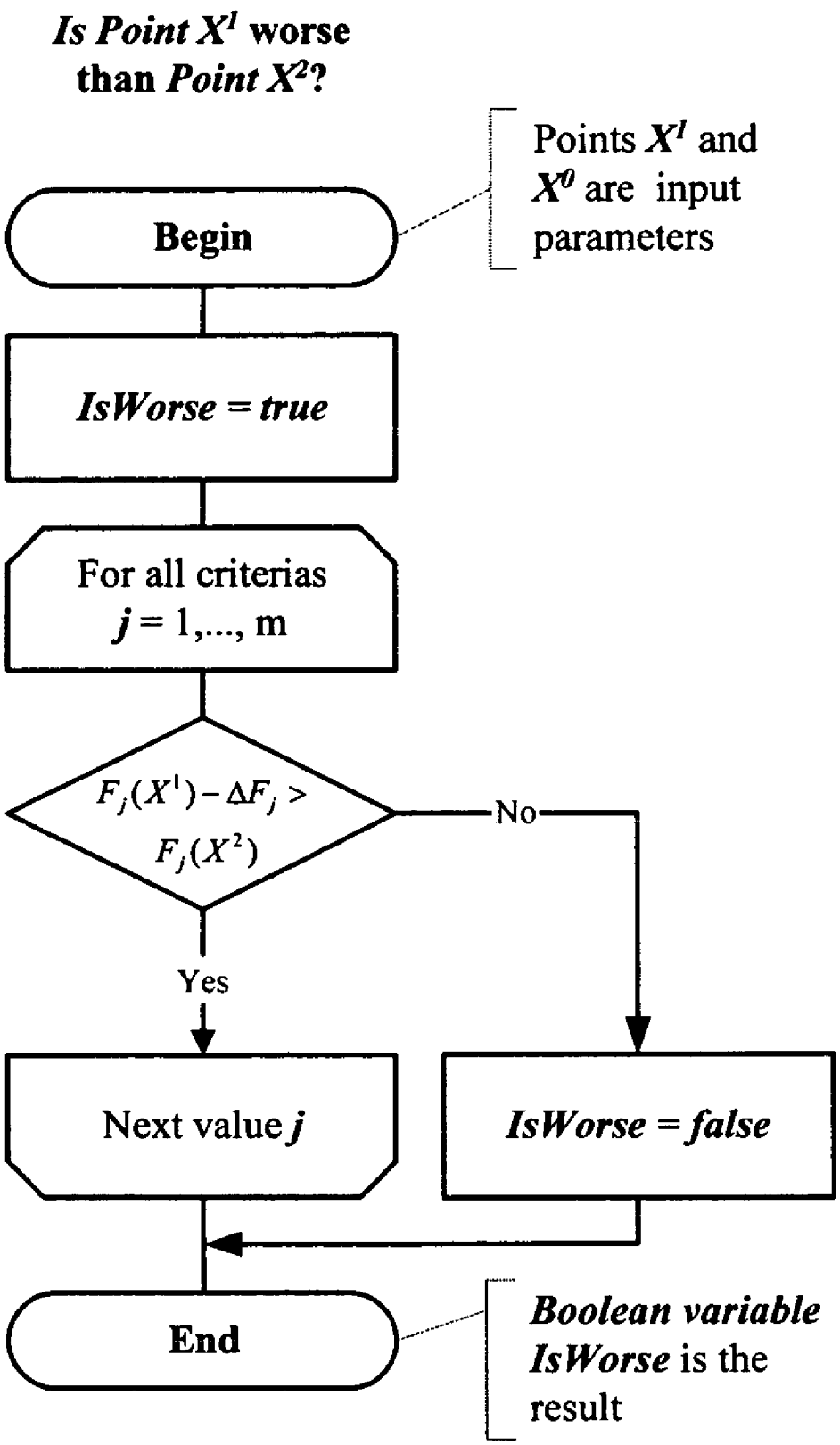
FIG. 8 is a flow chart of determination if one point is worse than another.
Figure 9:
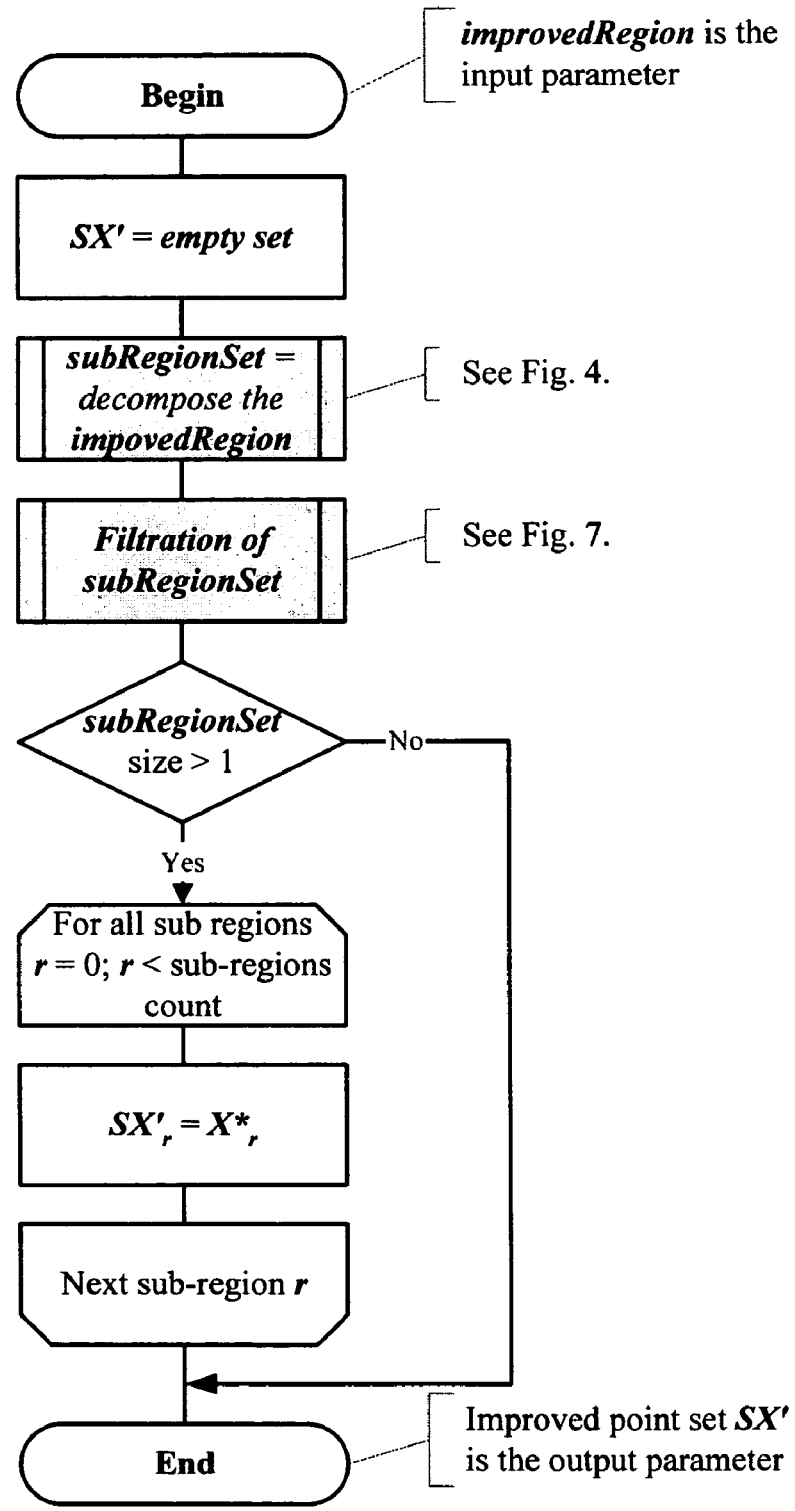
FIG. 9 is a flow chart of improvement via decomposition algorithm.

Let us consider filtration of points-candidates. It is performed as a comparison of each point-candidate against all other points. If one of compared points is substantially worse than another one, then it is excluded from the set of points-candidates (see the flowchart on FIG. 7).

Point $X^1 = \{x_1^1, \ldots, x_n^1\}$ is worse than the point $X^2 = \{x_1^2, \ldots, x_n^2\}$ if condition (10) is satisfied:

$$F_j(x_1^1, \ldots x_n^1) - \Delta F_j > F_j(x_1^2, \ldots x_n^2), j=1 \ldots m. \quad (10)$$

Condition (10) assumes that all objective functions are minimized. FIG. 6 illustrates the flowchart of the algorithm that determines which of two points is worse.

Thus, if point $X^k = \{x_1^k, \ldots, x_n^k\}$ is worse than any point $X^l = \{x_1^l, \ldots, x_n^l\}$, where l=0,1,...,k−1,k+1,... N, then point is considered as "blue" one, and excluded with its sub-region from further consideration (see FIG. 7.)

Improvement of a Point-Candidate

On the improvement stage points-candidates are generated in the prospective sub-regions, and improved by an iterative procedure until pre-assigned accuracy has been achieved.

The procedure of point-candidate improvement is applied to each "red" sub-region found via decomposition. An arbitrary point taken from a "red" sub-region can be used as initial point for the improvement procedure (see Appendix A.) But the center of a sub-region is a preferable choice because it simplifies calculation of gradients. Different improvement methods can be used for improvement of a point-candidate.

A common part of each improvement algorithm is the comparison of the current point and a new evaluated point, which is necessary to decide if a better point can be found. The comparison procedure can use different conditions to recognize if the new point is better than current one:

New point improves at least one objective function and is not worse in any other objective functions;
New point improves all objective functions except one, which does not get worse;
New point improves all objective functions simultaneously.

Let us consider a few improvement methods in detail.

Search Methods for Improvement a Point-Candidate

A variety of known search algorithms can be used for improvement of points-candidates taken in "red" sub-regions. One of such methods is the decomposition method described above. The following is a detailed description of the Decomposition Improvement algorithm.

Let us consider the following task:

Find improved point set SX' in the region R with core point $X^0$ and bounds $x_{l_i}^0 \leq x_i^0 \leq x_{u_i}^0$, i=1, . . . ,n.

Tolerances $\Delta x_i = x_{u_i} - x_{l_i}$ are calculated for all independent variables for pre-assigned approximation tolerance $\delta$.

Decomposition Improvement algorithm is applied with pre-assigned approximation tolerance $\delta$ to each "red" sub-region that is created on the decomposition stage of TERM algorithm (see "Decomposition" section.) It includes the following sequence of operations (see FIG. 7):

1. Initial region R with boundaries $x_{l_i}^0 \leq x_i^0 \leq x_{u_i}^0$ is decomposed into a set of sub-regions $R_j$; each sub-region is created with respect to the tolerance coefficients;
2. Filtration procedure filters out all "blue" sub-regions (see "Filtration of Sub-Regions and Points-Candidates" section.) As result, a set of "red" sub-regions is found;
3. Core point (or any other points from "red" sub-region) of each "red" sub-region is declared as improved point; this is the result of improvement via decomposition algorithm.

Figure 10A:
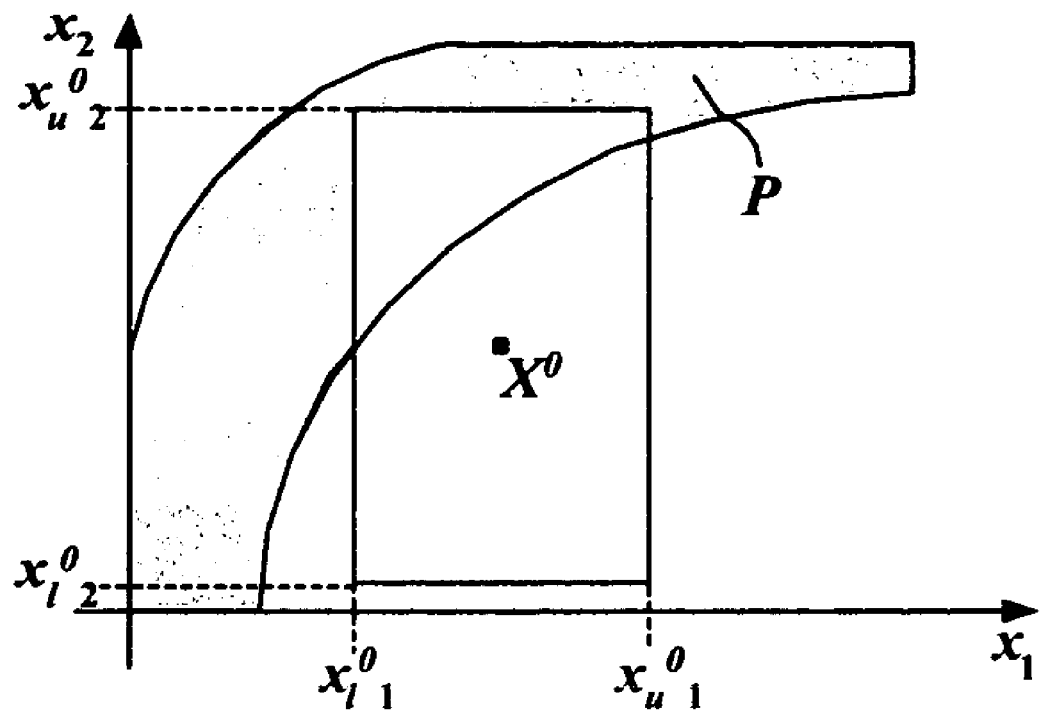
FIG. 10a is a graph, which illustrates intersection of current core sub-region with the area of true Pareto optimal solutions P.
Figure 10B:
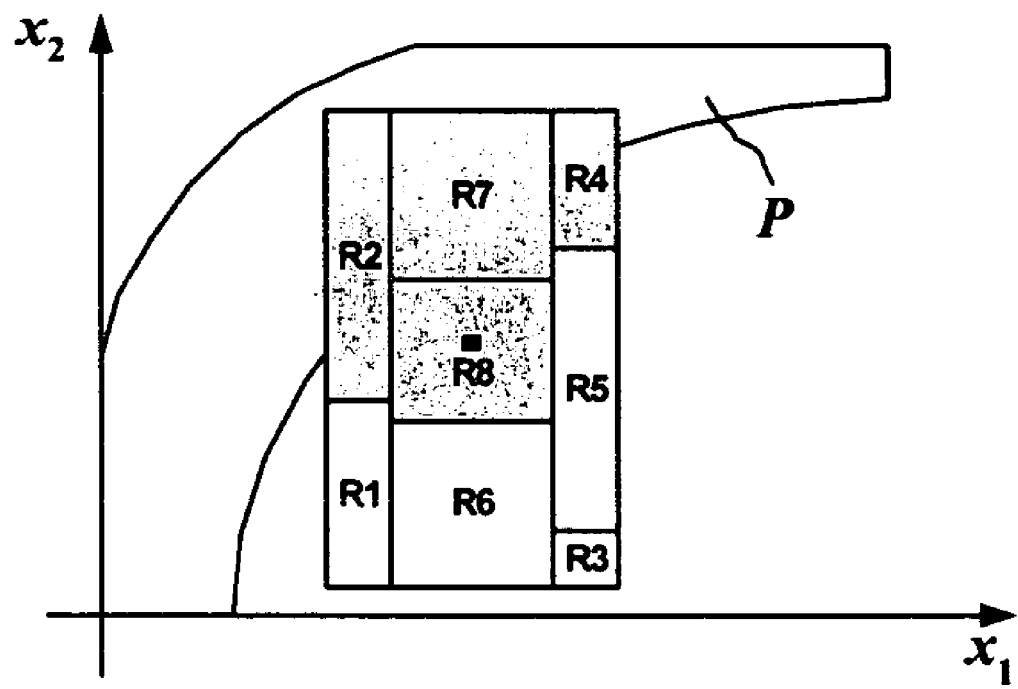
FIG. 10b is a graph, which shows a set of "red" sub-regions R2, R4, R7, and R8 those intersecting the area P of true Pareto optimal solutions. The sub-regions are created via Decomposition Improvement algorithm.

FIG. 10 illustrates the process of a point-candidate improvement via the decomposition algorithm for a task with two independent variables. As a result of decomposition, region R (see FIG. 10a) is decomposed into a set of sub-regions R1, . . . ,R8 (see FIG. 10b). Then filtration procedure is applied, and sub-regions R2,R4,R7,R8 are recognized as "red" ones. Core point (but it can be any other points taken in the sub-region) of each "red" sub-region is declared as improved point-candidate: $X^{*(2)}, X^{*(4)}, X^{*(7)}, X^{*(8)}$. So, we have the following set of improved points:

$$SX' = \{X^{*(2)}, X^{*(4)}, X^{*(7)}, X^{*(8)}\}.$$

If only one improved point is required then any of found points can be taken as a solution.

Simplex Improvement method also can be used for improvement of a point-candidate. Its major idea is to find a point on the core region boundary that improves at least one objective function without worsening other objective functions.

Figure 11:
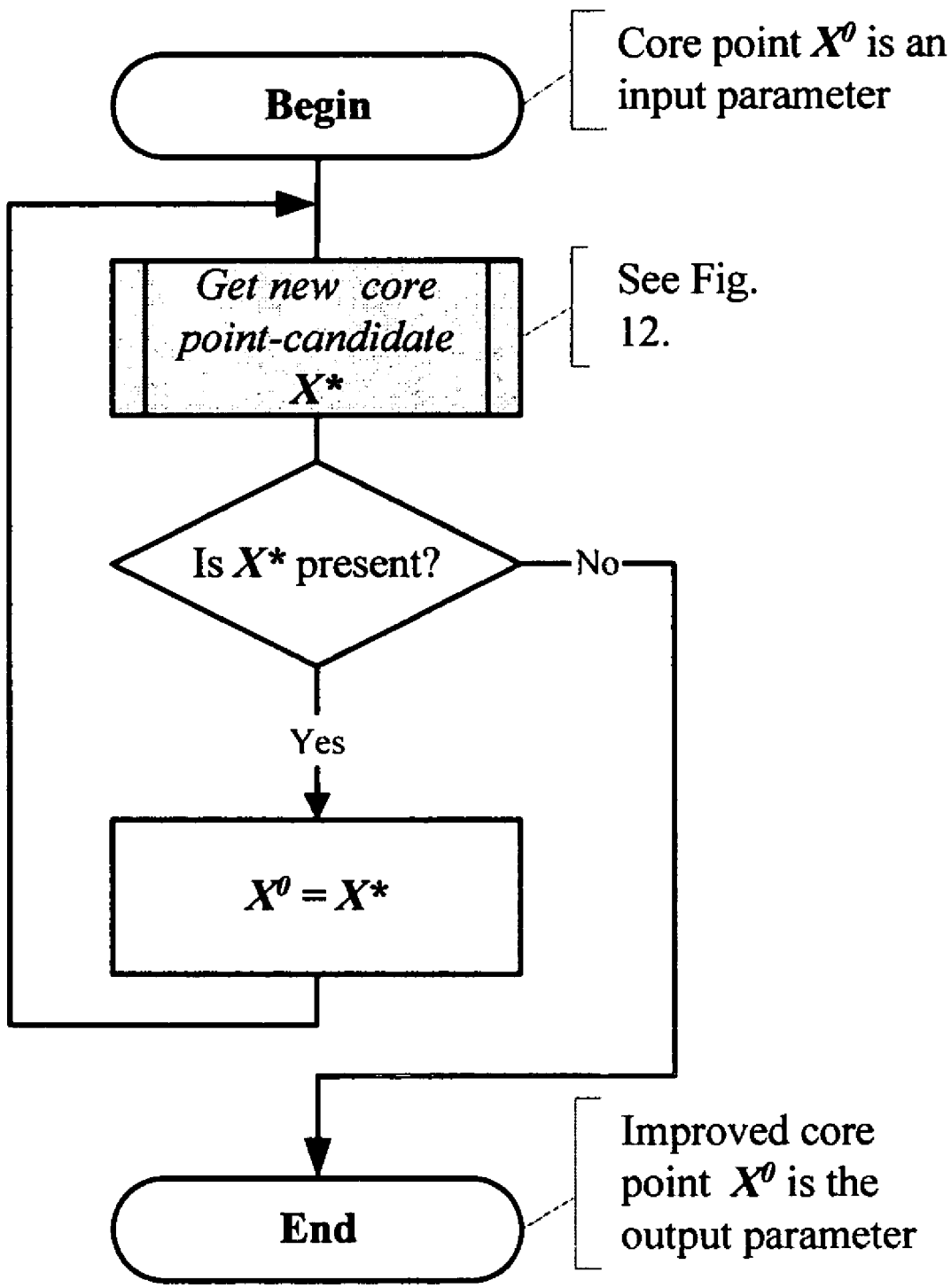
FIG. 11 is a flowchart of the general schema of core point improvement via the Simplex Improvement method.
Figure 12:
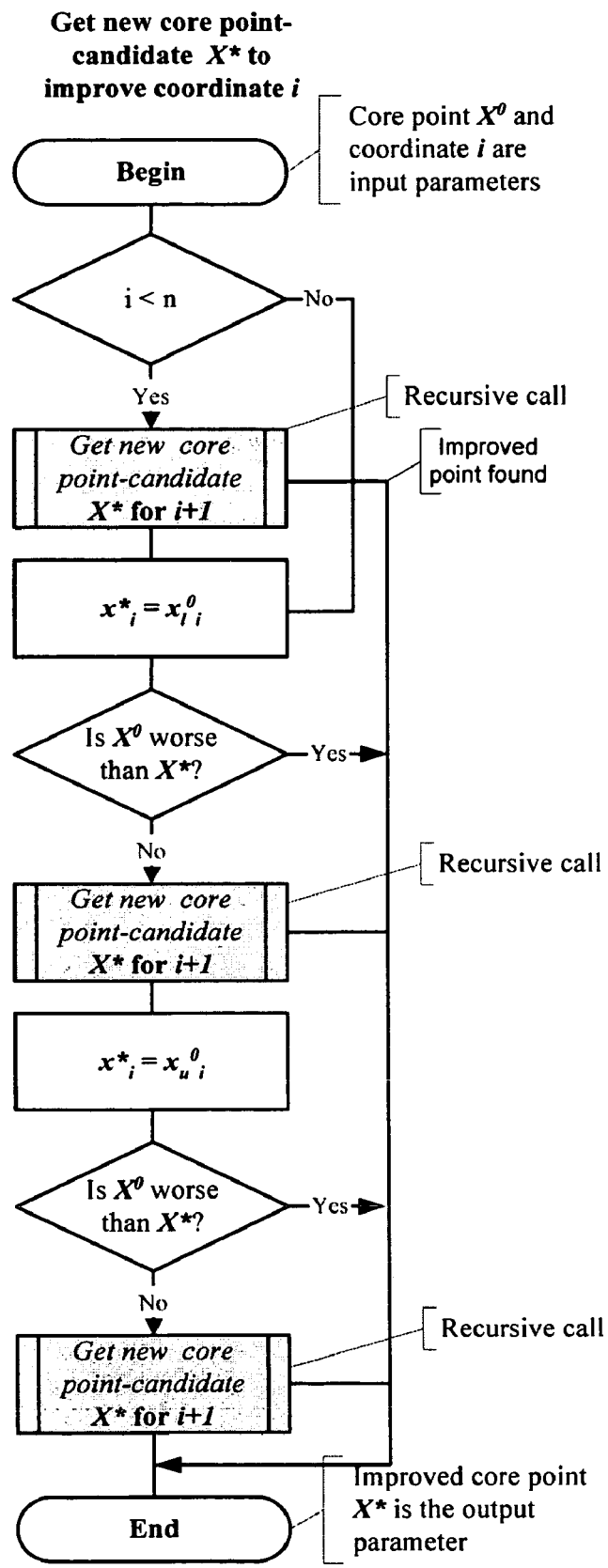
FIG. 12 is a flow chart of recursive finding of an improved point-candidate via Simplex method.

Simplex Improvement method can be performed in the following way (see FIG. 11):

1. Create a core sub-region $x_{l_i}^0 \leq x_i^0 \leq x_{u_i}^0$, i=1, . . . ,n for current core point $X^0$.
2. Take three values for each independent variable $x_i$: $x_i^1 = x_{l_i}^0$, $x_i^2 = x_i^0$ and $x_i^3 = x_{u_i}^0$.
3. Create all combinations of those values and calculate optimized objective functions on all the points: $X^*_k$, k=1, . . . ,$3^n - 1$ (see FIG. 12)
4. Compare calculated objective functions values with their values on the core point $X^0$. If core point $X^0$ is worse than new point $X^*_k$ then $X^*_k$ is declared as new core point. Go to step 1.
5. Point $X^*$ is declared as the solution (improved point.)

Figure 13:
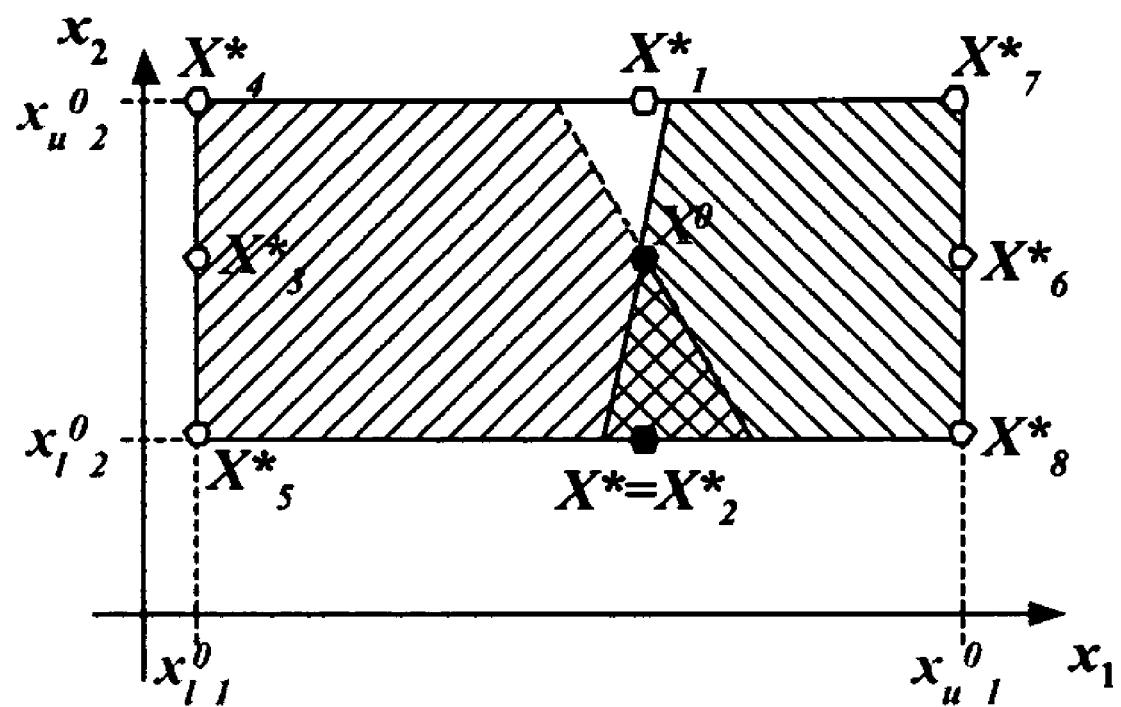
FIG. 13 is a graph, which illustrates the schema of evaluated points via Simplex improvement algorithm on the one iteration.

FIG. 13 illustrates an iteration of a point-candidate improvement process via Simplex Improvement algorithm. A task with two independent variables is illustrated. Objective functions are evaluated on the points $\{X^*_1, X^*_2, X^*_3, X^*_4, X^*_5, X^*_6, X^*_7, X^*_8\}$; point $X^*_2$ selected as a new point-candidate, because point $X^0$ is worse than $X^*_2$.

Gradient-Based Optimization Methods for Improvement a Point Candidate

Traditional single-objective optimization methods based on scalarization technique also can be used for improvement of point-candidates.

There is a unique advantage of TERM algorithm, which allows further development of the approach. As follows from the description of TERM numerical method, and especially from the section Numerical Solution with Pre-Assigned Accuracy (see Appendix A, section A.1), a sub-region surrounding an initial point contains a part of Pareto frontier approximated with pre-assigned accuracy (see FIG. 13a.) So, it is not necessary to use the entire design space $\overline{X}$ for the gradient-based optimization. The search space should be limited by the boundaries of the sub-region $R_i$ for the initial point $x_i$, $i=1,\ldots,n$ (see FIG. 13b).

Figure 14A:
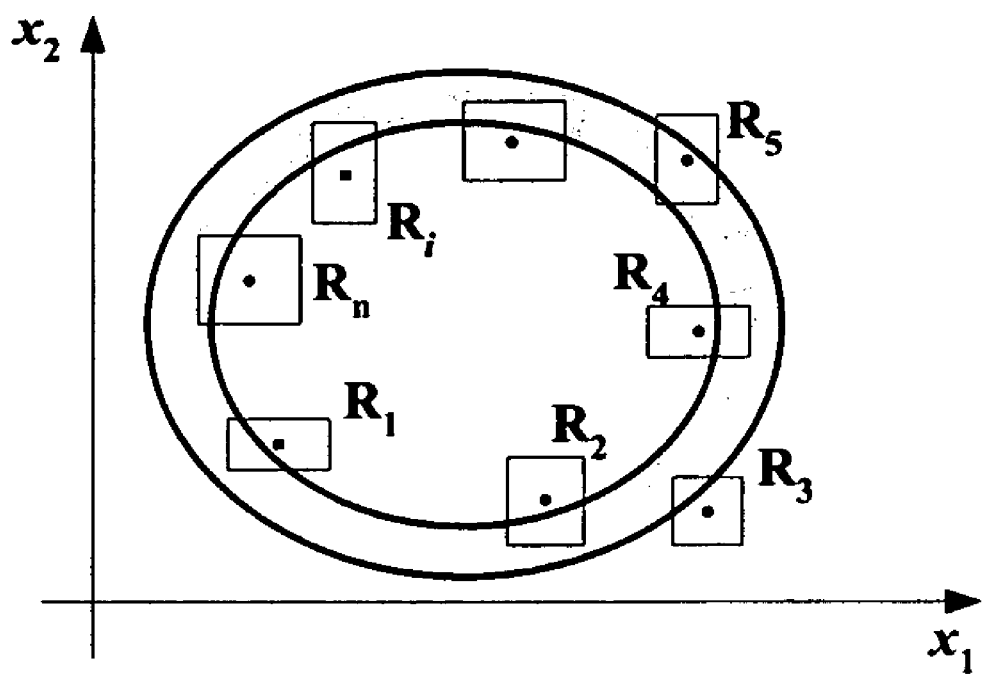
FIG. 14a is a graph, which illustrates found "red" sub-regions intersecting true Pareto-frontier; each sub-region has a point-candidate inside.
Figure 14B:
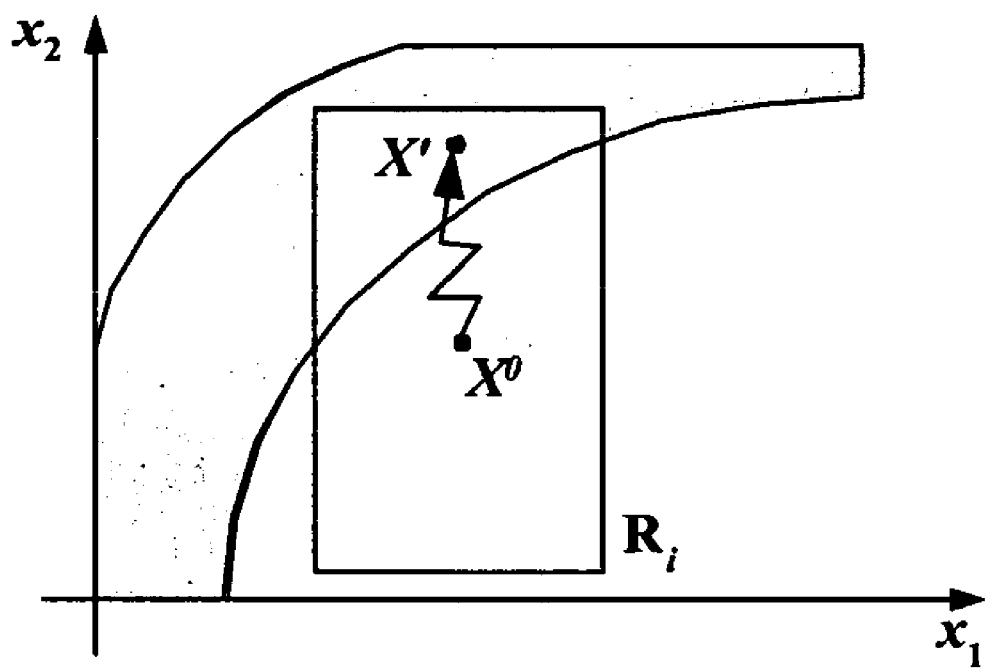
FIG. 14b is a graph, which illustrates optimization by a traditional gradient-based method starting from a point-candidate, and finding a solution in the true Pareto-frontier area.

FIG. 14 illustrates two stages of multi-objective optimization performed in this way:

14a—Start TERM algorithm and find required number of initial points and their sub-regions with pre-assigned accuracy; the size of sub-regions surrounding each initial point determined by the pre-assigned accuracy; each sub-region includes an approximation of Pareto points determined by the pre-assigned accuracy;

14b—After initial point has been obtained, gradient-based optimization is started. It stops after an optimal point has been found inside of the sub-region. Each initial point is processed similarly one by one.

Combination of inventive TERM algorithm with traditional gradient-based optimization methods is a hybrid algorithm that utilizes TERM's ability to find good initial points, and improves the points via computationally efficient gradient-based methods. Such a hybrid algorithm allows avoiding weak sides of traditional gradient-based methods relying on scalarization technique: inability to find initial points, and difficulties in finding Pareto points.

Concurrent Gradients Method for Improvement a Point Candidate

This method determines the area of simultaneous objective functions improvement in the core sub-region, and finds a point in the area that improves the objective functions.

Let us consider the following task:

max $F_j(X)$, $j=1,\ldots,m$ for core point $X^0$ and bounds:
$x_{l_i}^0 \leq x_i^0 \leq x_{u_i}^0$ created around the core point $X^0$ with respect to objective functions tolerances $\Delta F_j$;
$G_j$, $j=1,\ldots,m$ are gradients for objective functions $F_j$ That show the improvement direction for corresponded objective functions.

Gradients of all objective functions need to be evaluated at the core point:

$$G_j(X), j = 1, \ldots, m, \text{ where } G_j(X) = \left\{\frac{\partial F_j}{\partial x_1}, \ldots, \frac{\partial F_j}{\partial x_n}\right\}.$$

Each gradient shows the direction where corresponding objective function is getting better (maximized in our sample.) Let us consider a flat $L_j(X)$ perpendicular to the corresponded gradient $G_j=\{g_1^j,\ldots,g_n^j\}$ in the core point $x^0$. The flat splits current sub-region into two parts: area $A_j$ where objective function $F_j(X)$ is getting better, and area $B_j$ where $F_j(X)$ is getting worse. In reality a surface splits the sub-region into $A_j$ and $B_j$ areas. So, we assume that the sub-region is small enough to use the flat $L_j(X)$ as an approximation of the surface.

Let us formulate an equation of the flat that is perpendicular to the gradient vector $G_j$; we assume that $X^0$ is the origin of coordinates:

$$L_j(X)=g_1^j \cdot x_1+g_2^j \cdot x_2+ \ldots +g_n^j \cdot x_n$$

All points that satisfy the condition $L_j(X)<0$ decrease the value of objective function $F_j(X)$. On another side of the flat all points satisfy the condition $L_j(X)>0$, and they increase the value of objective function $F_j(X)$.

Correspondingly, all points satisfying the system of inequalities (11) increase values of all objective functions simultaneously:

$$\left.\begin{array}{l}L_1(X) > 0 \\ L_2(X) > 0 \\ \ldots \\ L_m(X) > 0\end{array}\right\} \text{ or } \left.\begin{array}{l}g_1^1 \cdot x_1 + g_2^1 \cdot x_2 + \ldots + g_n^1 \cdot x_n > 0 \\ g_1^2 \cdot x_1 + g_2^2 \cdot x_2 + \ldots + g_n^2 \cdot x_n > 0 \\ \ldots \\ g_1^m \cdot x_1 + g_2^m \cdot x_2 + \ldots + g_n^m \cdot x_n > 0\end{array}\right\} \quad (11)$$

This is the key point of the Concurrent Gradients method. The system of inequalities (11) determines the area of simultaneous improvement of all objective functions $A_{SI}$. Now we need to find a point $X' \in A_{SI}$ satisfying conditions (11), and the core point $X^0$ will be improved with respect to all objective functions.

Let us consider a graphical interpretation of the method for the simplest multi-objective optimization task with two independent variables and two objective functions that need to be maximized. Our goal is to:

determine the area of simultaneous improvement for both objective functions;
determine the direction of next step in the optimization process;
determine the length of the step.

In this way we will find next point $X'=\{x^*_1, \ldots, x^*_n\}$, which is a solution of the system of inequalities (11).

FIG. 15 illustrates $i^{th}$ iteration of the improvement process for a sample task with two independent variables and two maximized objective functions. The variables on the FIG. 15 have the following meaning:

$\{x_1^0, x_2^0\}$ is a core point $X^0$, which needs to be improved on the $i^{th}$ iteration;
$x_{l_1}^0 \leq x_1 \leq x_{u_1}^0, x_{l_2}^0 \leq x_2 \leq x_{u_2}^0$—boundaries of the core sub-region created around the core point $X^0$; the size of the sub-region is determined by objective functions tolerances $\Delta F_1$, $\Delta F_2$;
$G_1$ and $G_2$ are gradients of objective functions $F_1$ and $F_2$ those indicate the direction of maximization for each objective function; if objective functions $F_1$ and $F_2$ need to be minimized then opposite vectors $-G_1$ and $-G_2$ can be used to determine the direction of minimization for each objective function;
$Xg_1 \cap Xg_2$—intersection points of gradients $G_1$ and $G_2$ with unit sphere (unit circle for our 2-dimensional sample) with the center in the point $X^0$;
$G^*$ is the vector, which indicates the direction of simultaneous improvement of all objective functions;
$A_1$ is the area of points improving the objective function $F_1$;
$A_2$ is the area of points improving the objective function $F_2$;
$A_{SI}$ is the area of points improving both objective functions $F_1$ and $F_2$ simultaneously;
$A_{SI}=A_1 \cap A_2$;
$X'=\{x^*_1, x^*_2\} \in A_{SI}$ is new point candidate, which improves all the objective functions simultaneously.

Finding a new point-candidate on the $i^{th}$ iteration can be performed in the following way:

FIG. 15$a$ illustrates the following: calculate the gradient $G_1$ on the point $X^0$ for the objective function $F_1$; create a flat $L_1$ that is perpendicular to the gradient $G_1$; flat $L_1$ is the boundary between area $A_1$ of the points improving the objective function $F_1$, and area $B_1$ of the points where the objective function $F_1$ gets worse;

FIG. 15$b$ illustrates similar determination of area $A_2$ where function $F_2$ gets better;

FIG. 15$c$ illustrates that area of simultaneous improvement for both objective functions $F_1$ and $F_2$ is equal to intersection of areas $A_1$ and $A_2$: $A_{SI}=A_1 \cap A_2$;

FIG. 15$d$ illustrates finding points $Xg_1$ and $Xg_2$ as intersections of gradients $G_1$ and $G_2$ with unit sphere (unit circle in the sample);

FIG. 15$e$ illustrates determination of the direction of simultaneous improvement for all objective functions; such direction can be calculated as a vector $G^*=\{g_1,g_2\}$, where $g_1,g_2$ is arithmetic mean of maximal and minimal coordinates of points $$Xg_1 \text{ and } Xg_2 : g_1 = \frac{\max(xg_1^1, xg_2^1) - \min(xg_1^1, xg_2^1)}{2},$$

$$g_2 = \frac{\max(xg_1^2, xg_2^2) - \min(xg_1^2, xg_2^2)}{2}.$$

FIG. 15$f$ illustrates determination of new point-candidate $X'=\{x^*_1, x^*_2\}$ as intersection of the vector $G^*$ with boundary of the core sub-region.

Figure 16:
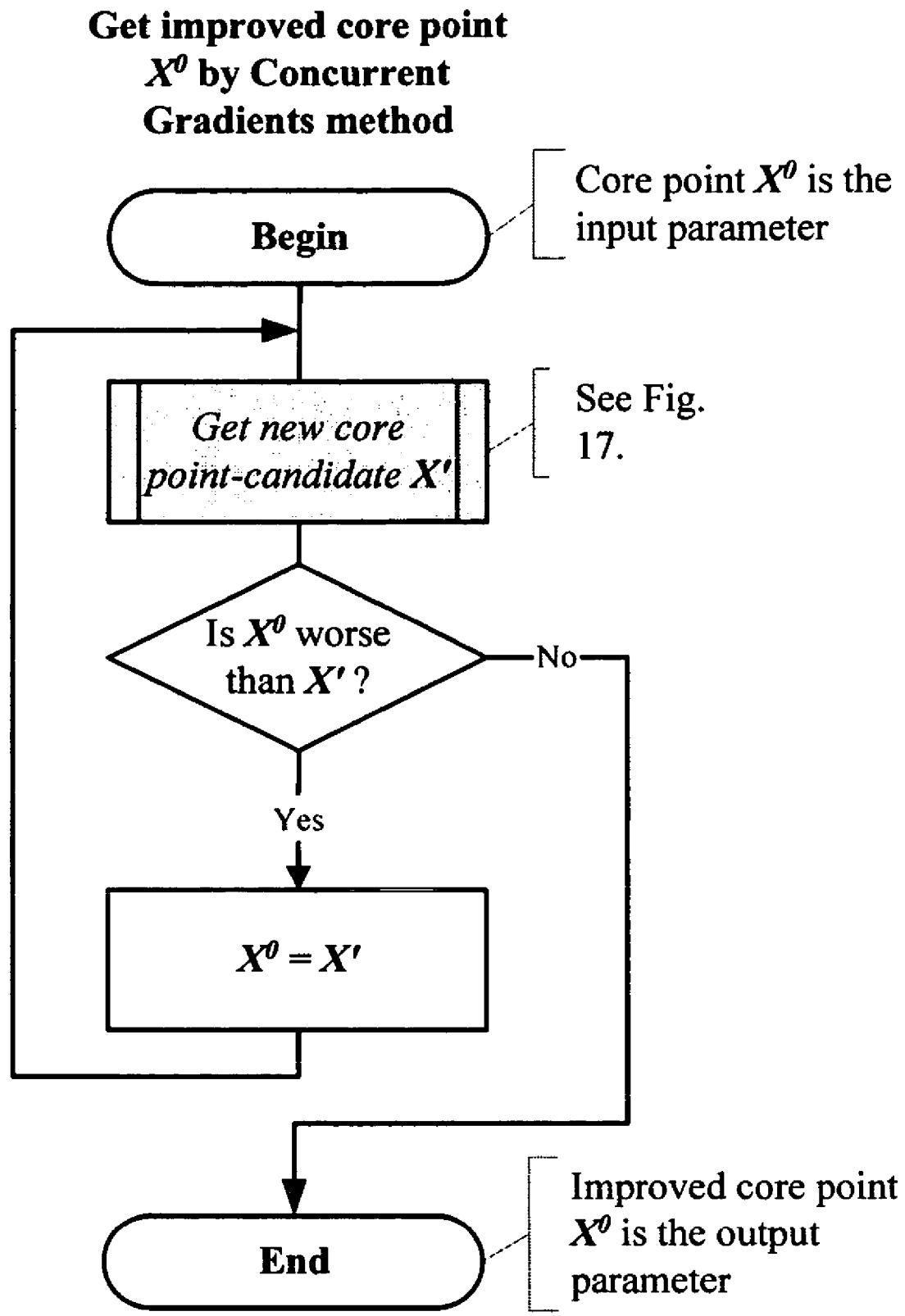
FIG. 16 is a flowchart, which shows the schema of point improvement by Concurrent Gradients method; (See details on FIG. 17)
Figure 17:
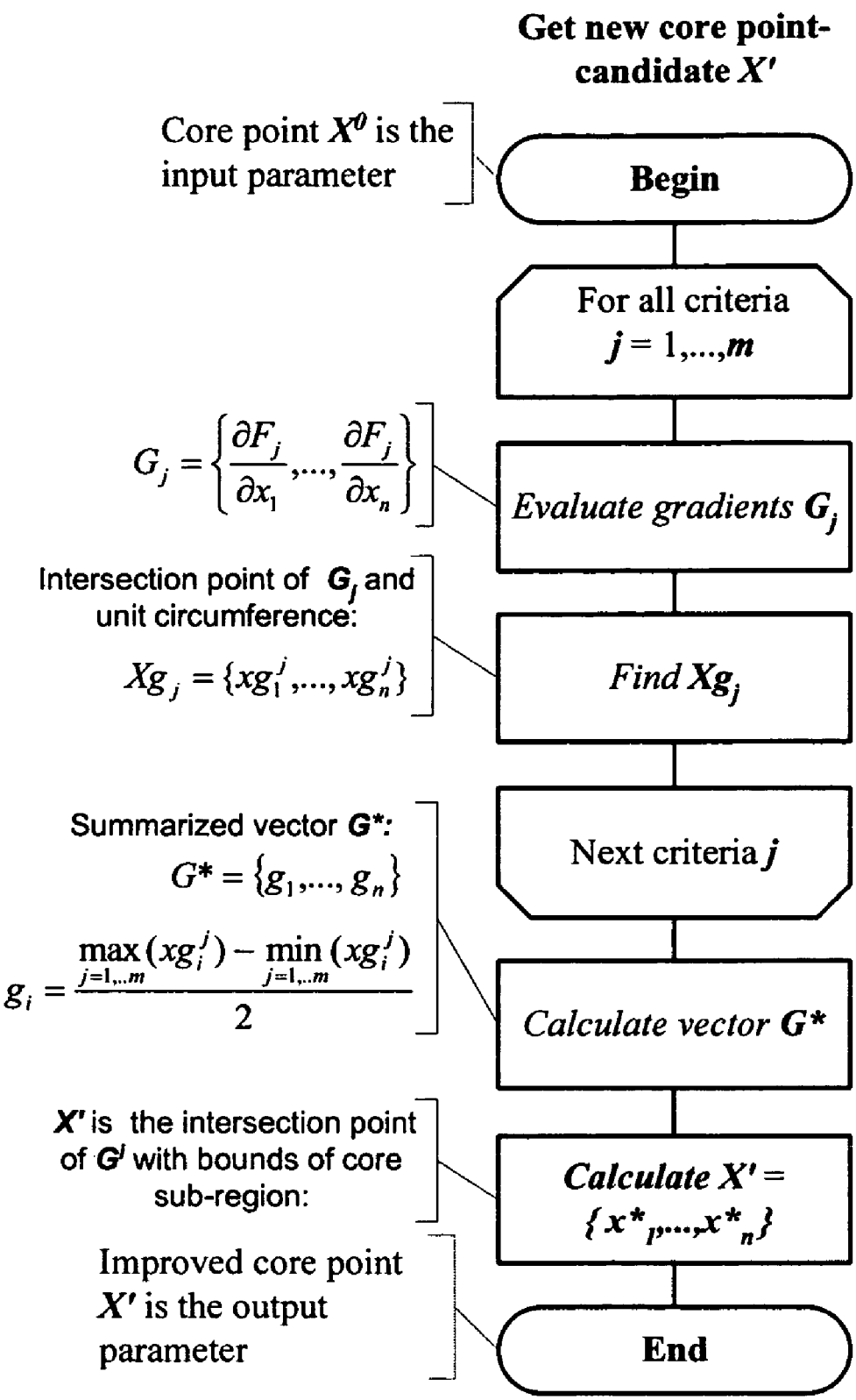
FIG. 17 is a flowchart for creating a new core point-candidate by Concurrent Gradients method.
Figure 18:
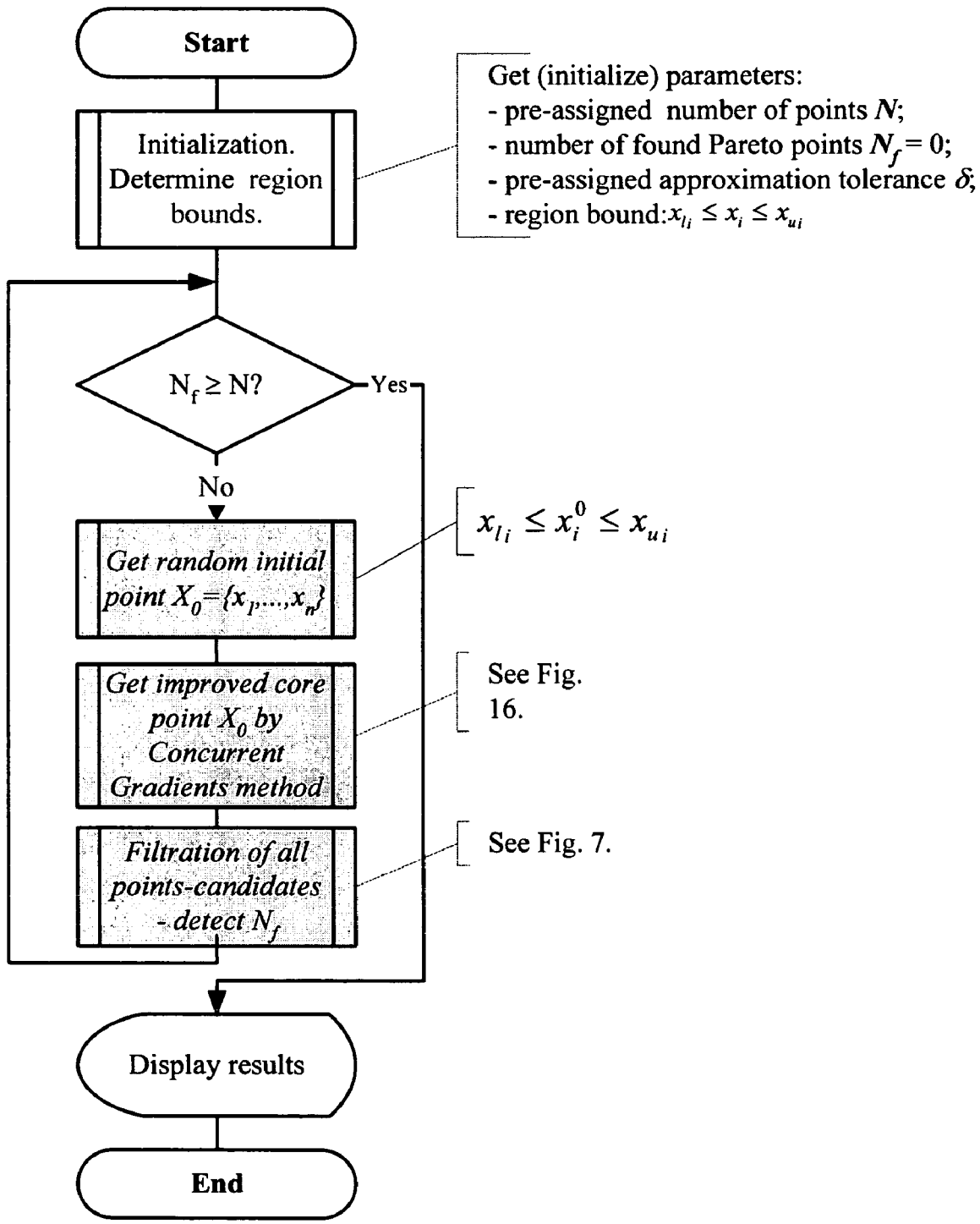
FIG. 18 is a general flowchart of the Concurrent Gradients algorithm (See details on FIGS. 16-17).

In general case for n independent variables and m minimized objective functions new point-candidate can be found by the Concurrent Gradients method (see FIG. 16 and FIG. 17) in the following way (if an objective function $F_j$ needs to be maximized then $-F_j$ can be minimized):

1. Create a core sub-region with the center in the initial point $X^0$. The size of the core sub-region is determined by tolerances $\Delta F_j$, j=1, . . . ,m. Created core sub-region has the following boundaries: $x_{l_i}^0 \leq x_i \leq x_{u_i}^0$, i=1, . . . ,n.
2. Calculate gradients for all objective functions in the initial point $X^0$:

$$\nabla F_j(X) = \left\{\frac{\partial F_j}{\partial x_1}, \ldots, \frac{\partial F_j}{\partial x_n}\right\}, j = 1, \ldots, m.$$

3. Calculate vectors that indicate direction of improvement for corresponded objective functions: for maximized objective functions $G_j(X) = \nabla F_j(X)$; for minimized objective functions $G_j(X) = -\nabla F_j(X)$.
4. Calculate intersection points $Xg_j$ of vectors $G_j$ with surface of the unit sphere, where $Xg_j=\{xg_1, \ldots, xg_n\}$, j=1, . . . ,m.
5. Calculate vector $$G^* = \{g_1, \ldots, g_n\}, \text{ where } g_i = \frac{\max_{j=1,\ldots,m}(xg_i^j) - \min_{j=1,\ldots,m}(xg_i^j)}{2}.$$

6. Find new point-candidate X' as intersection of the vector $G^*$ and boundaries of the core sub-region.
7. If point X' is better than initial point $X^0$ then declare point X' as new initial point: $X^0=X'$, and continue improvement process; go to step 1;
8. Point $X^0$ is declared as improved point-candidate; improvement process is completed.

Gradients $\nabla F_j(X)$, j=1, . . . ,m necessary on the step 2, can be calculated by variety of known ways: via numerical methods, automatic differentiation, Response Surface method, based on local approximations of objective functions.

While we believe the vector $$g_i = \frac{\max_{j=1,\ldots,m}(xg_i^j) - \min_{j=1,\ldots,m}(xg_i^j)}{2}$$

belongs to the area $A_{SI}$ for tasks of any dimension and any number of objective functions, we don't wish to be bound by this. So, here are alternative ways to find points in the area $A_{SI}$.

Area of simultaneous objective functions improvement $A_{SI}$ can be found as solution of inequalities system. Each inequality is determined by the flat surface that is perpendicular to the corresponded gradient (see FIGS. 15$a$-15$c$).

There are a variety of ways to determine points $X' \in A_{SI}$. Any method of numerical or analytical solution to a system of inequalities can be utilized for that. The simplest approach is the Monte Carlo method, which generates a uniformly distributed sequence of points in the core sub-region, and filters out from the points those do not satisfy the system of inequalities.

One possible approach applies Cluster Analysis to the points of intersection of the gradients of objective functions and the unit sphere that is created with the center in the current point. This approach can be effective in the case of a large number of objective functions. Cluster Analysis reduces the number of objective functions to the number of found clusters, which simplifies finding the next step direction and new points in the area of simultaneous objective functions improvement $A_{SI}$.

Proper selection of the next step direction in the area of simultaneous objective functions improvement $A_{SI}$ is an important element of the CGM algorithm. A priori preferences can be determined as weights for the objective functions.

If all objective functions have equal weight then the middle of the $A_{SI}$ area should be taken as the direction of the next step. In this case all objective functions have equal chances to be improved during the optimization process.

If some of objective functions have higher weight compared with others then preferable step direction should be closer to the direction of the gradients corresponded to higher weighted objective functions. In this case high weighted objective functions are improved more, and the optimization result reflects a priori preferences.

Concurrent Gradients Method for Solving General Multi-Objective Optimization Problem Above section describes how CGM can be used as a part of TERM algorithm for improvement of core points found on the decomposition stage, but CGM can be used also as an independent method of multi-objective optimization.

CGM is a generalization of gradient-based approach for multi-objective optimization.

Let us compare sequence of steps typical for traditional gradient-based optimization method with CGM.

Traditional gradient-based optimization algorithm works in the following way:

Starts from a given initial point;
Evaluates gradient of the objective function in current point;
Determines the direction for the next step:
Takes the direction indicated by the evaluated gradient as the direction for the next step;
Determines optimal size of the step;
Makes a step in the direction indicated by the gradient.

Figure 15A:
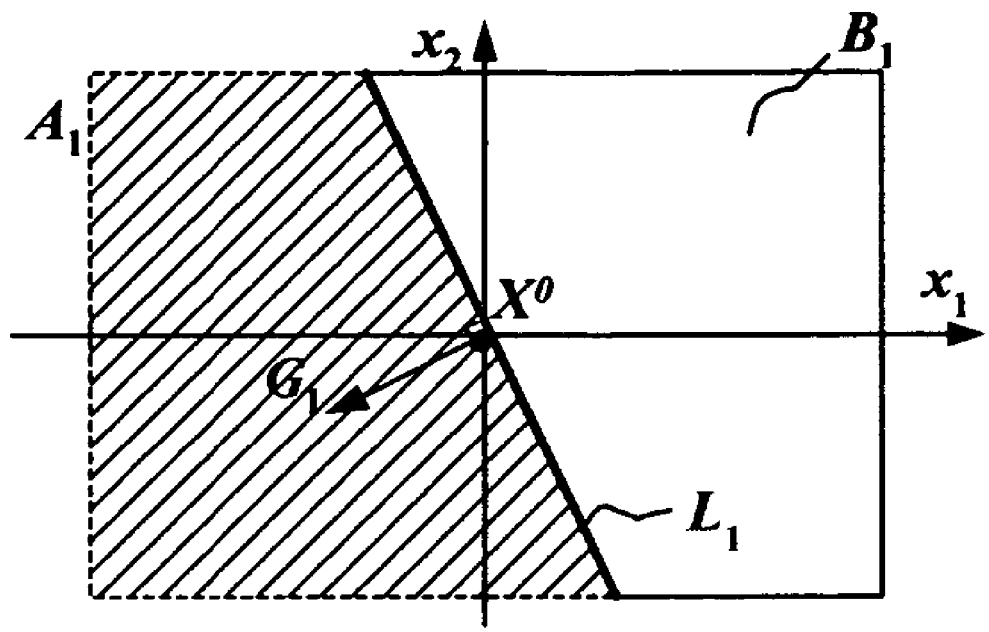
FIG. 15a is a graph, which illustrates determination the area of improved values $A_1$ for first objective function.
Figure 15B:
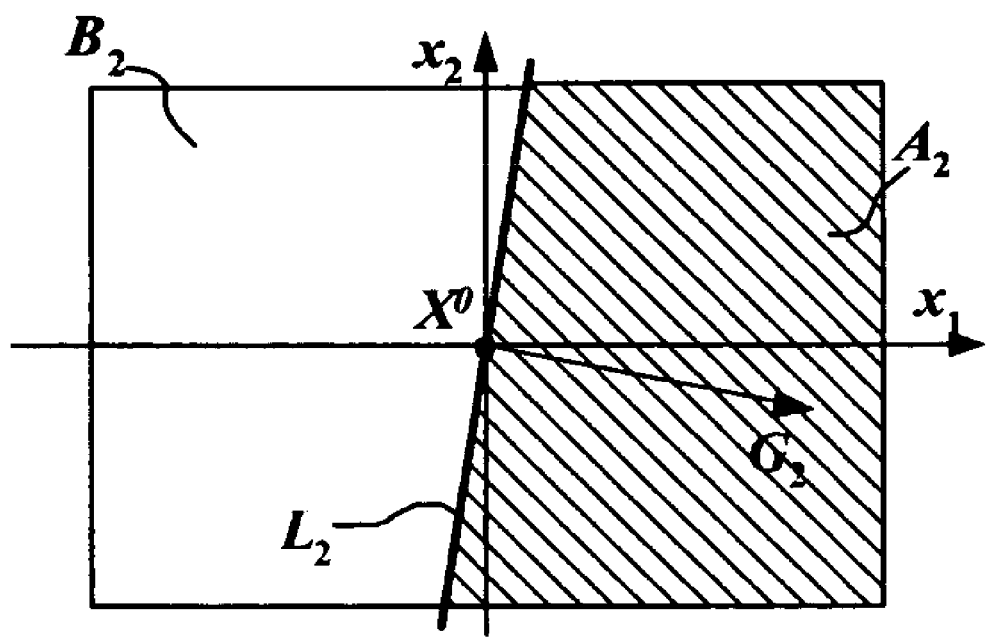
FIG. 15b is a graph, which illustrates determination the area of improved values $A_2$ for second objective function.
Figure 15C:
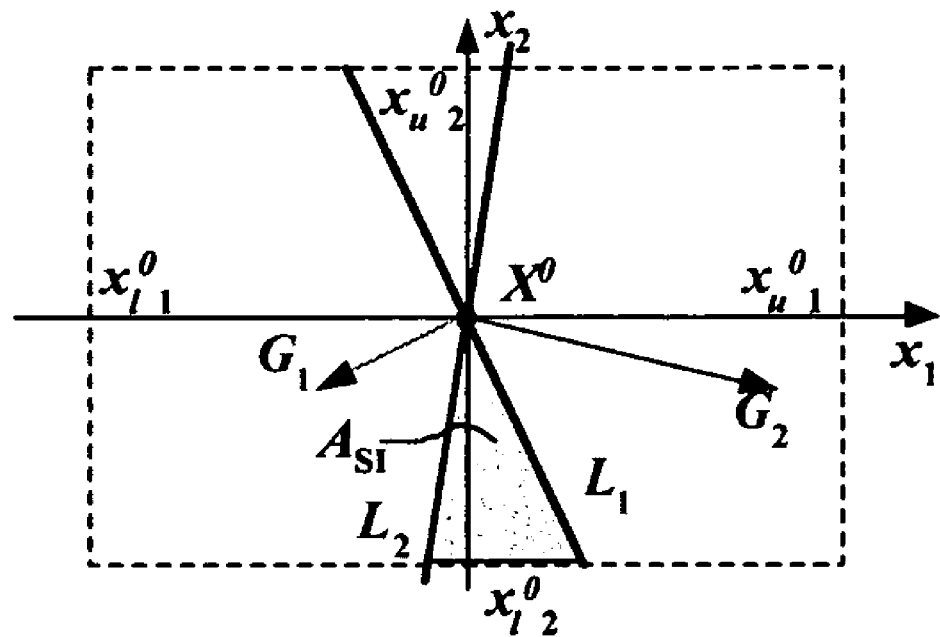
FIG. 15c is a graph, which illustrates determination the area of simultaneous objective functions improvement $A_{SI}$ for both first and second objective functions.
Figure 15D:
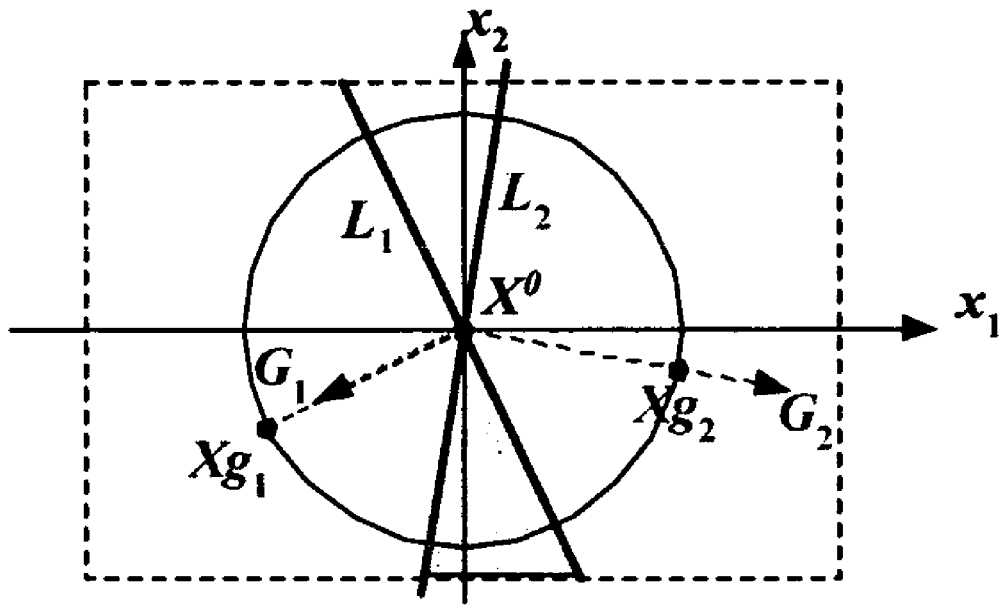
FIG. 15d is a graph, which illustrates finding points $Xg_1$ and $Xg_2$ as intersections of gradients $G_1$ and $G_2$ with unit sphere (unit circle in the sample)
Figure 15E:
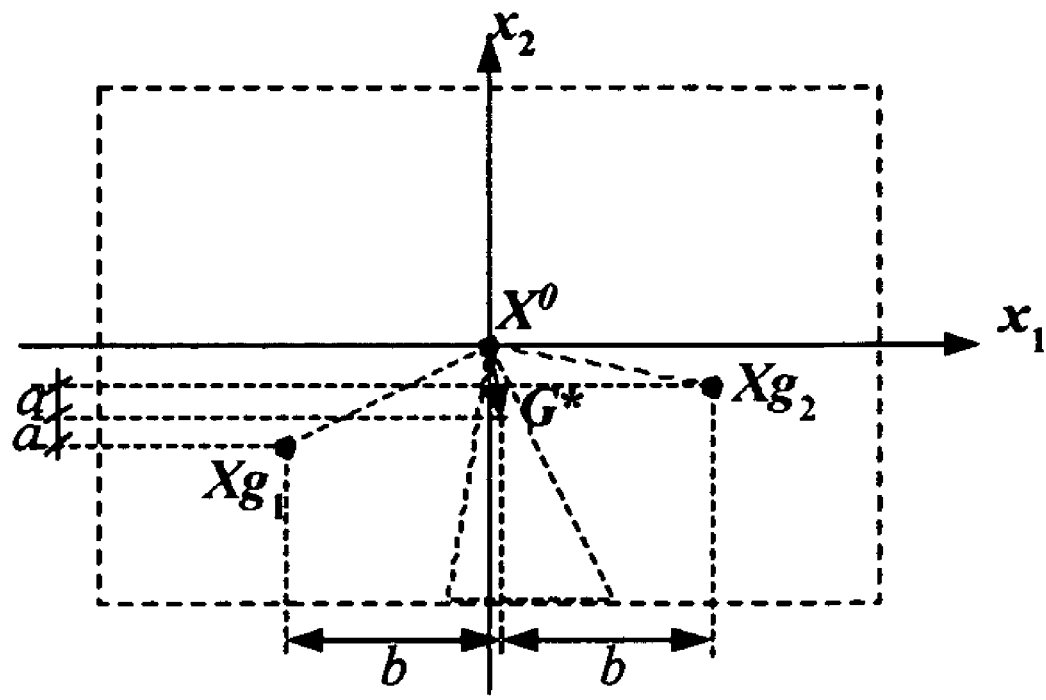
FIG. 15e is a graph, which illustrates determination of the direction of simultaneous improvement for all objective functions.
Figure 15F:
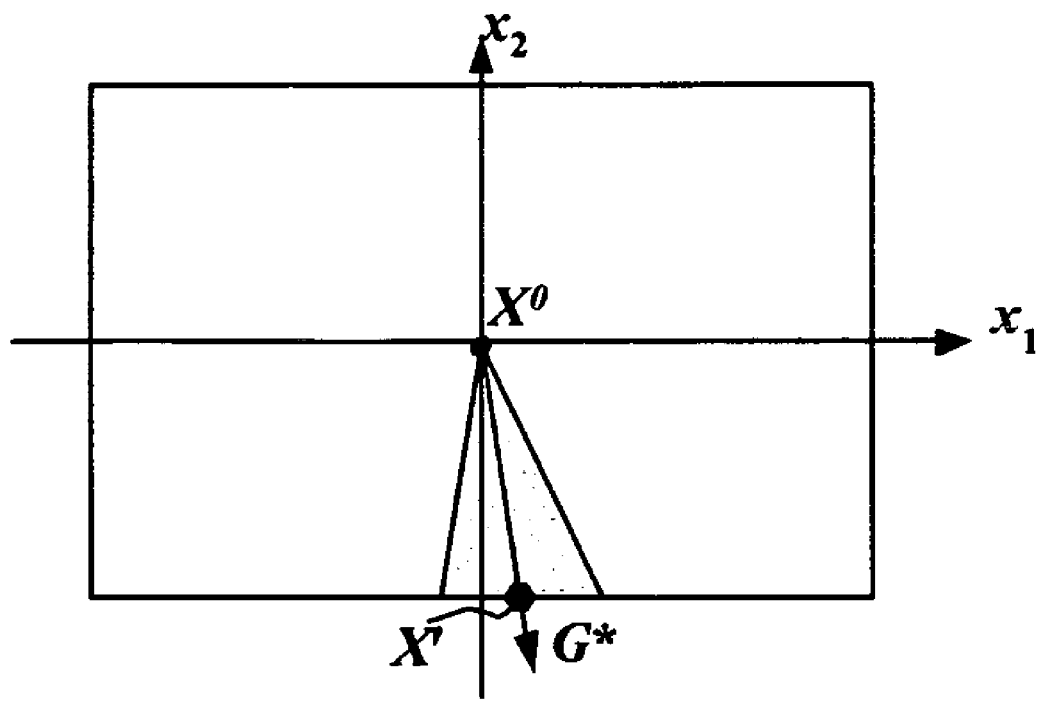
FIG. 15f is a graph, which illustrates determination of new point-candidate $X^i=\{x^*_1, x^*_2\}$ as intersection of the vector $G^i$ with boundary of the core sub-region.

Traditional gradient-based optimization algorithms optimize only one objective function, and the gradient perfectly determines the direction of the objective function improvement, as it shown on FIG. 15a.

CGM works as any gradient-based algorithm. But it has multiple objectives to optimize, and it determines the direction for the next step in such a way that all objective functions will be improved simultaneously. CGM works in the following way:

Starts from a given initial point;
Evaluates gradients of all objective functions in current point;
Determines the direction for the next step:
Determines the area of simultaneous improvement $A_{SI}$ for all objective functions; $A_{SI}$ is found based on evaluated gradients (see FIGS. 15a-15c),
Determines a vector G that indicates the direction of the next step inside the $A_{SI}$ area (see FIGS. 15d-15f);
Determines optimal size of the step;
Makes the step in the determined direction inside of the $A_{SI}$ area.

Invented technique based on determination of the area of simultaneous improvement for all objective functions introduces new type of numerical analysis in multi-objective optimization theory, and allows developing extremely efficient optimization algorithms without using the scalarization technique or any kind of heuristic. CGM is first multi-objective optimization algorithm which successfully solves multi-objective optimization tasks with hundreds and thousands of independent variables.

According to CGM, a step cannot be done in a direction that improves some objective functions and makes other ones worse. No objective function gets worse on the next step, which allows significantly reduction in the number of iterations until the optimal point is found, and improvement in quality of results. This is the main difference in comparison with traditional gradient-based algorithms. Those improve a weighted sum of objective functions and ignore current value of each of them.

Traditional single-objective gradient-based optimization technology has many methods to improve convergence and computational efficiency of optimization process. CGM works in the same way as traditional algorithms except the determination of search direction. Such similarity allows reusing existing techniques. For instance, optimum step-length can be determined exactly as it is done in the steepest-descent algorithm [5]. Another important technique to reuse is response surface method (RSM.) RSM creates local approximation of objective functions, and uses them for calculation of gradients. This technique is especially effective for large-scale optimization tasks with thousands of independent variables because it reduces the number of objective functions evaluations thousands of times.

There is another attractive opportunity to convert most of known gradient-based single-objective optimization algorithms into multi-objective optimization algorithms by changing the search direction determination to the inventive method.

Such an opportunity allows CGM to successfully compete in computational efficiency with the fastest optimization algorithms. Ability to solve multi-objective optimization tasks so fast makes CGM a preferable choice algorithm for the most challenging tasks in design optimization industry.

While the present invention has been described in connection with the illustrated embodiments, it will be appreciated and understood that modifications may be made without departing from the true spirit and scope of the invention which is limited only by the appended claims and their equivalents.

Appendix A. Numerical Method TERM for Multi-Objective Optimization

A.1. Definition of a Multi-Objective Optimization Problem

The multi-objective optimization problem is formulated as follows:

$$\text{Minimize: } F(X)=\{F_1(X), F_2(X), \ldots, F_m(X)\}, m \geq 2 \quad (A.1.1)$$

$$X \text{ is subject to } q_j(X) \leq 0, (1 \leq j \leq p), \quad (A.1.2)$$

$$x_{l_i} \leq x_i \leq x_{u_i}, (1 \leq i \leq n). \quad (A.1.3)$$

Where m is a number of objective functions and p is a number of inequality constraints.

$X=\{x_1, \ldots, x_n\} \in \overline{X} \subset E^n$ is a vector of design variables (also called decision variables), where n is a number of independent variables.

$F(X) \in E^n$ is a vector of objective functions $F_i(X): E^n \rightarrow E^1$.

Functions $F_i(X)$, $i=1, \ldots, m$, and $q_j(X)$, $j=1, \ldots, p$ satisfy Lipschitz condition.

The feasible design space D (often called the feasible decision space or constraint set) is defined as the set $\{X|q_j(X) \leq 0, j=1, \ldots, p\}$ The feasible criterion space Z (also called the feasible cost space or the attainable set) is defined as the set $\{F(X)|X \in \overline{X}\}$).

Definition 1. Pareto Optimal: a feasible point, $X^* \in \overline{X}$, is Pareto optimal, if there is no other feasible point $X \in \overline{X}$, which satisfies the following conditions:

$$F(X) \leq F(X^*), \text{ with at least one } F_i(X) < F_i(X^*) \quad (A.1.4)$$

All Pareto optimal points are denoted by P, and are the solution to the Multi-objective problem formulated in Eqs. A.1.1-A.1.3. Pareto points P lie on the boundary of the feasible criterion space Z.

Extended Definition of a Multi-Objective Optimization Problem

Let us call point $X \in \overline{X}$ an approximately feasible point if it satisfies the following system of inequality constraints:

$$q_j(X) \leq \Delta q_j, j=1, \ldots, p, \quad (A.1.5)$$

where $\Delta q_j > 0$ are accuracy coefficients for the condition defined in Eq. A.1.2.

Obviously, any feasible point is approximately feasible.

Definition 2. Approximately Pareto Optimal: an approximately feasible point, $X^* \in \overline{X}$, is approximately Pareto optimal, if there is none other such an approximately feasible point, $X \in \overline{X}$, that satisfies conditions from Eq. A.1.4.

All approximately Pareto optimal points are denoted by $S_{AO}$, and represent the solution to the extended problem of Multi-Objective Optimization. However, $S_{AO}$ in general is an infinite set, and finding it could be a daunting task. So, let us reduce the problem to finding a finite sub-set of $S_{AO}$, which approximates it in a certain sense. Let us call this set an Approximating Set $S_A$.

Pre-Assigned Approximation Accuracy: Let us associate each design variable $x_i$, objective function $F_i(X)$, and constraint $q_i(X)$ with a positive number, which will be called "pre-assigned approximation accuracy," and be denoted by $\delta x_i$, $\delta F_i$, and $\delta q_i$ respectively. Let us also denote $F_i(X^*)$ by $F_i^*$, and $q_i(X^*)$ by $q_i^*$, $X^* \in X$.

Definition 3. Vicinity of a point: Set of points satisfying conditions (1.6) is called vicinity of the point, and denoted by V if:

$$|x_i^* - x_i| < \delta x_i, i=1,\ldots,n;$$

$$|F_j^* - F_j| < \delta F_j, j=1,\ldots,m;$$

$$|q_k^* - q_k| < \delta q_k, k=1,\ldots,p. \qquad (A.1.6)$$

Point $X^*$ approximates any other point $X \in V$ with the pre-assigned accuracy.

Improvement Tolerance: Let us associate each objective function $F_i(X)$ with a positive number $\Delta F_i$ named "improvement tolerance". Then consider two points $X_a \in \overline{X}$ and $X_b \in \overline{X}$, where $X_a$ is an approximately feasible point. We can say that point $X_a$ substantially improves the point $X_b$ if the following condition is satisfied:

$$F_i(X_a) + \Delta F_i < F_i(X_b), i=1,\ldots,m. \qquad (A.1.7)$$

In this case we can also say that the objective function $F_i$ is improved by more than $\Delta F_i$ upon transfer from point $X_a$ to the point $X_b$.

Numerical Solution with Pre-Assigned Accuracy: The numerical solution of the Multi-Objective Conditional Optimization problem with the pre-assigned approximation accuracy and improvement tolerance consists of the construction of the approximating set of points $S_A$ in the given region X, i.e., the finite set of points, which possess the following attributes:

1. There is at least one point from $S_A$ corresponding to any point from $S_{AO}$ within the vicinity determined by the pre-assigned approximation accuracy. In other words, any point from $S_{AO}$ is approximated by a certain point from $S_A$;
2. The conditions of permissibility at any point from $S_A$ are not disturbed by more than 2 "improvement tolerances", i.e., $$F_i(X) < 2 \cdot \Delta F_i, i=1,\ldots,m; \qquad (A.1.8)$$

3. None of the points, which belong to $S_A$, can be substantially improved by any approximately feasible point $X \in \overline{X}$. Here by substantial improvement is implied an improvement by all objective functions $F_i$ by more than $2 \cdot \Delta F_i$.

A.2. Description of the Basic Procedures of the Numerical Solution

Basic Analysis Procedure in the Assigned Region

Let us for brevity refer to a multidimensional parallelepiped in the design space X as a rectangular region or sub-region.

The basic analysis procedure in the assigned region could be used to find a numerical solution of multi-objective optimization problem with pre-assigned accuracy of approximation and improvement tolerance.

This procedure, referred as a basic analysis hence forth, consists of decomposing the assigned rectangular region into rectangular sub-regions of two types, which we will call "blue" and "red". "Blue" sub-regions do not have any Pareto optimal points. "Red" sub-regions contain solutions of the optimization task. So, a set of "red" sub-regions serves as a result of the analysis process. Each red sub-region contains a determined point, which represents the sub-region, and will be called "green point".

This process is close to the values of chosen improvement tolerances with a trade-off between processing speed and the accuracy of the results. In order to get a "big picture" with not very representative $S_A$, a loose improvement tolerance could be used, which will lead to generation of less green points faster. On the other hand, if the improvement tolerance is too strict, there will be impractically too many green points generated during slow and thorough calculations.

General Schema

The procedure of analysis is recursive: the analysis of the given region, which represents the region of the $1^{st}$ generation, leads to the analogous analysis of its sub-regions (regions of $2^{nd}$ generation), each of them in turn leads to the analysis of the regions of the $3^{rd}$ generation, and et cetera.

Let us denote an arbitrary point within the given region, which we will consider as the current region of the $1^{st}$ generation, as a core point, and rectangular vicinity surrounding this point as the core sub-region of the current region.

Core sub-region can consist of points, which do not belong to the set of approximately Pareto optimal points $S_{AO}$. In this case we will consider it as "blue", while otherwise as "red".

Let us set aside any painted in ether color core sub-region from its generating current region of the $1^{st}$ generation. Then the remaining part can be decomposed into the rectangular regions of the $2^{nd}$ generation. Each of these sub-regions is made "current" and undergoes the same procedure subsequently: a) selection of a core point; b) generation of a core sub-region; c) decomposing the sub-region into the sub-regions of the $3^{rd}$ generation. This process is virtually infinite, but core sub-regions have finite dimensions, and the decomposing is only possible if the current region does not completely overlap with the core sub-region generated by it.

At the end of the process the given region of the $1^{st}$ generation is decomposed into the "blue" and "red" core sub-regions of the $1^{st}$, $2^{nd}$, et cetera generations.

Simultaneously with the process of decomposing the given region, another procedure takes place. This other procedure generates an intermediate set of points $S_I$. Towards the end of both processes $S_I$ becomes the "approximating set" $S_A$.

Generation of a Sub-Region with Bounded Variation of Objective Function $R_B$

Suppose that all objective and feasibility functions ($F_i(X)$, $i=1,\ldots,m$, and $q_j(X)$, $j=1,\ldots,p$) satisfy Lipschitz condition in the given region, which can be formulated as follows:

For any objective function $F(X)$ there exist such constants $L_1, L_2, \ldots, L_n$, that for any "i" and for any two points $X^{(1)}$, $X^{(2)} \in \overline{X}$, which differ just by i-th projection, the following inequalities are satisfied:

$$|F(X^{(1)}) - F(X^{(2)})| \leq L_i \cdot |x_i^{(1)} - x_i^{(2)}|, i=1,\ldots,n. \qquad (A.2.1)$$

In other words, it is assumed that a vector of the constants $(L_1, L_2, \ldots, L_n)$ is known for each objective function. Finding this vector is a separate problem that will be discussed later.

Now, consider any point $X_0 \in \overline{X}$ and generate its surrounding rectangle in the design space $\overline{X}$, in which the values of objective function $F(X)$ differ from $F(X_0)$ by less than pre-set value dif, i.e., $$|F(X) - F(X_0)| < dif, \text{ where } dif \text{ is an arbitrary positive number} \qquad (A.2.2)$$

So, $$|F(X) - F(X_0)| = |F(x_1, x_2, \ldots, x_n) - F(x_1^0, x_2^0, \ldots, x_n^0)| \quad \text{(A.2.3)}$$

$$= |F(x_1, x_2, \ldots, x_n) - F(x_1^0, x_2, \ldots, x_n) +$$

$$F(x_1^0, x_2, \ldots, x_n) - F(x_1^0, x_2^0, \ldots, x_n) +$$

$$F(x_1^0, x_2^0, \ldots, x_n) - \ldots -$$

$$F(x_1^0, x_2^0, \ldots, x_{n-1}^0, x_n) +$$

$$F(x_1^0, x_2^0, \ldots, x_{n-1}^0, x_n) -$$

$$F(x_1^0, x_2^0, \ldots, x_n^0)| \le$$

$$|F(x_1, x_2, \ldots, x_n) - F(x_1^0, x_2, \ldots x_n)| +$$

$$|F(x_1^0, x_2, \ldots, x_n) -$$

$$F(x_1^0, x_2^0, \ldots, x_n)| + \ldots +$$

$$|F(x_1^0, x_2^0, \ldots, x_{n-1}^0, x_n) -$$

$$F(x_1^0, x_2^0, \ldots, x_{n-1}^0, x_n^0)| \le$$

$$L_1 \cdot |x_1 - x_1^0| + L_2 \cdot |x_2 - x_2^0| + \ldots +$$

$$L_n \cdot |x_n - x_n^0|$$

There are several ways to determine the above-mentioned rectangle. Here we use the simplest, but not the most efficient method.

Any point x of this rectangle must be located within the boundaries of the given region, and in addition the following conditions should be satisfied for those i for which $L_i > 0$:

$$|x_i - x_i^0| < dif/(k \cdot L_i), \text{ where } k \text{ is a number of nontrivial } L_i \quad (k \le n) \quad \text{(A.2.4)}$$

From Eqs. A.2.3 and A.2.4 it follows that the conditions in Eq. A.2.2 are satisfied and that the desired rectangle (region with bounded variation of the objective function $R_B$) is the intersection of rectangle defined by Eq. A.2.4 and the assigned region.

Let us take again any point $X_0 \in \overline{X}$ and certain value $F_l$, that $$F_l < F(X^0) \quad \text{(A.2.5)}$$

Assume that $dif = F(X_0) - F_l - \epsilon$, where $\epsilon$ is an arbitrarily small positive value. Then it is possible to generate such a region with bounded variation of the objective function $F(X)$ in the design space $\overline{X}$, that the following condition is satisfied:

$$F_l < F(X) \quad \text{(A.2.6)}$$

Expansion of a Region with Bounded Variation of Objective Function: Let us assume that in the assigned region X, objective function F is increasing (decreasing) monotonically with respect to any of the varied parameters (for certainty let it be $x_1$). Then it is possible to extend the region with bounded variation of the objective function, by moving aside its upper (lower) boundary corresponding to $x_1$ towards the appropriate boundary of the assigned region X. In this case condition from Eq. A.2.6 is still satisfied.

Use of a Local Lipschitz Condition: Evidently, there is a need to generate a region with bounded variation of objective function inside of the current region. In this case it is more appropriate to use Lipschitz constants $L_i$, which is local to the current region, instead of global ones related to the entire given region X. This assumption does not invalidate anything said in the above section, but limits the region from X to the current one. Let us also note, that local $L_i$ can be considerably less than global one, which makes it possible to increase $R_B$ and improve the efficiency of the computations.

A.3. The "Blue" Base Sub-Region

Possible Cases: A core point $X_0 \in \overline{X}$ is said to be significantly improved by the certain approximately feasible point $X_a \in \overline{X}$, if the following conditions are satisfied:

$$F_i(X_a) < F_i(X_0) - \Delta F_i, i=1, \ldots, m. \quad \text{(A.3.1)}$$

The feasibility condition $q_j \le 0$ is also said to be substantially disturbed at point $X_0$, if $$q_j(X^0) > 2 \cdot \Delta q_j, j=1, \ldots, p. \quad \text{(A.3.2)}$$

If at least one of these cases occurs, it is possible to build core "blue" sub-region. Let us examine both these cases in more details.

Creating a "Blue" Core Sub-Region of the $1^{st}$ Type: Suppose, one of the conditions of feasibility, for certainty let it be the 1st condition, is substantially disturbed at the core point:

$$q_1(X_0) > 2 \cdot \Delta q_1. \quad \text{(A.3.3)}$$

Let us assign $F_1 = \Delta q_1$ in Eqs. A.2.5 and A.2.6. Then $$F_1 < q_1(X^0). \quad \text{(A.3.4)}$$

If we assign $$dif = q_1(X^0) - F_1 - \epsilon \quad \text{(A.3.5)}$$

and use the monotony of function $q_1(X)$, then it is possible to build such a $R_B$ of the varied parameters X, that $$F_1 \le q_1(X), \quad \text{(A.3.6)}$$

so $$q_1(X) > \Delta q_1 \quad \text{(A.3.7)}$$

and, therefore, there are no approximately feasible points within the $R_B$. It follows from Eqs. A.3.3 and A.3.5 that $$dif > \Delta q_1 - \epsilon, \quad \text{(A.3.8)}$$

i.e., the feasible change of objective function $q_1(X)$ has the same degree of accuracy as $\Delta q_1$.

The generated $R_B$ (Eq. A.3.7) does not contain any approximately optimum points belonging to $S_{AO}$ and, therefore, it could be considered as "blue" core sub-region.

Creating a "Blue" Core Sub-Region of the $2^{nd}$ Type: Let us suppose that a core point $X_0$ is significantly improved by certain approximately feasible point $X_a$ that belongs to the given region X. Then the following system of the inequalities is satisfied for all objective functions:

$$F_i(X_a) + \Delta F_i < F_i(X^0), i=1, \ldots, m. \quad \text{(A.3.9)}$$

It is assumed for the $i^{th}$ objective function, that $$F_1 = F_i(X_a). \quad \text{(A.3.10)}$$

Therefore $$F_1 \le F_i(X^0) \quad \text{(A.3.11)}$$

If we assign $$dif = F_i(X_0) - F_1 - \epsilon, \quad \text{(A.3.12)}$$

and use the monotony of function $F_i(X)$, then it is possible to build such a $R_B$ of the varied parameters X, that $$F_1 < F_i(X), \quad \text{(A.3.13)}$$

so $$F_i(X_a) < F_i(X) \quad \text{(A.3.14)}$$

If we build an intersection of m such rectangles, any point X of this intersection could be improved by approximately feasible point $X_a \in \overline{X}$. Thus, this intersection does not contain approximately optimal points from $S_{AO}$ and, therefore, it can be considered as "blue" core sub-region.

Let us note, that for each i, it follows from Eqs.3.9 and 3.12 that, $$dif = F_i(X_0) - F_i(X_a) - \epsilon > \Delta F_i - \epsilon, \qquad (A.3.15)$$

i.e., the feasible change of objective function $F_1(X)$ is approximately the same as tolerance $\Delta F_i$.

A.4. The "Red" Core Sub-Region

Generating the "Red" Core Sub-Region: If it is impossible to generate a "blue" core sub-region corresponding to any core point $X_0$, then a "red" core sub-region is generated, which is constructed from the intersection of the current region with, in general case, the regions with bounded variation of objective function (both feasibility and quality) and varied parameters. In other words, conditions A.1.6 must be satisfied for the "red" core sub-region. Furthermore, at the core point in this case none of the conditions of permissibility (Eq. A.1.2) can be substantially disturbed. Otherwise, "blue" core sub-region could be generated for this point.

"Green" Point: Let us call the core point of a "red" base sub-region a "green" point. We will show latter on, that by the end of the analysis process the generated set of "green" points is in a certain sense (see subsection Numerical Solution with Pre-Assigned Accuracy) the approximating set $S_A$ for the set of approximately optimal points $S_{AO}$.

Strictly speaking, "green" point must be approximately feasible, otherwise it is possible to use the described above procedure to find an approximately feasible point in the sequential region, or to prove, that there is no such a point. If there are no approximately optimal points in the sequential region, this region should be considered as "blue".

Let us note that at the core point of "red" sub-region none of the conditions of feasibility (Eq. A.1.2) can be substantially disturbed, otherwise "blue" core sub-region is generated for this core point. Therefore, allowing a certain tolerance, it is possible not to search for the green point, but consider the core point as the green one.

A.5. Exclusion of a "Red" Sub-Region from the Set of the "Red" Sub-Regions

Suppose that we have a "red" sub-region corresponding to a core point $X_1 \in \overline{X}$. It is possible to find a new approximately feasible core point $X_2 \in \overline{X}$, which significantly improves point $X_1$, during the refining analysis. Then $$F_i(X_2) + \Delta F_i < F_i(X_1), i=1, \ldots, m. \qquad (A.5.1)$$

Let us demonstrate that this point with the certain condition will improve any point of this "red" sub-region.

From Eq. A.1.5 follows:

$$F_i(X) > F_i(X_1) - \delta F_i \qquad (A.5.2)$$

or $$F_i(X_1) < F_i(X) + \delta F_i. \qquad (A.5.3)$$

From (A.3.22) and (A.3.23):

$$F_i(X_2) < F_i(X_1) - \Delta F_i < F_i(X) + \delta F_i - \Delta F_i \qquad (A.5.4)$$

or $$F_i(X_2) < F_i(X) + \delta F_i - \Delta F_i. \qquad (A.5.5)$$

Now let us add an additional constraint for the approximation accuracy:

$$\delta F_i < \Delta F_i, i=1, \ldots, m, \qquad (A.5.6)$$

i.e., the approximation accuracy must be less than the improvement tolerance. Then $$F_i(X_2) < F_i(X), i=1, \ldots, m. \qquad (A.5.7)$$

This means that none of the points X of the "red" sub-region can be approximately optimal. Therefore, this "red" sub-region changes its color to "blue".

A.6. Creation of the Approximating Set $S_A$

All pairs of "red" core sub-regions and the corresponding "green" points found during the analysis process are put into the Intermediate Set of Points $S_I$. Before any new pair could be added to the $S_I$ it is compared to the already existing pairs. If there is any existing pair, which "green" point could be substantially corrected by the new pair (by more than 1 tolerance), then this old pair is excluded from the $S_I$, and the new one is added instead. Section A.5 demonstrates that the "red" core sub-region of the deleted pair does not contain approximately optimal points (from $S_{AO}$) and therefore it can be "re-colored" into "blue".

It is sufficient to show that the $S_I$ by the end of the analysis process possesses all the attributes 1)-3) described in Numerical Solution with Pre-assigned Accuracy, section A.1. In order to prove that $S_I$ could be considered as the approximating set $S_A$ at the end.

A.6.1. Let us show that any point, which belongs to the set of approximately optimum points $S_{AO}$, is approximated with the pre-assigned accuracy by a certain point from $S_A$.

The procedure of analysis is built so that any point from the assigned region is covered by at least one of the core sub-regions. Any point from $S_{AO}$ must be covered by a "red" sub-region, but the green point of a "red" sub-region approximates any of its own points.

A.6.2. Section A.4 demonstrates that the conditions of feasibility (see inequality A.1.2) cannot be disturbed by more that 2 improvement tolerances at any "green" point.

A.6.3. Let us prove that any point from the approximating set $S_A$, cannot be improved by any approximately feasible point of the given region by more than 2 improvement tolerances.

We will use the proof by contradiction method.

Suppose a point $X_0$ belongs to $S_A$, and also suppose there is an approximately feasible point $X_a \in \overline{X}$, which improves point $X_0$ by more than 2 improvement tolerances.

There are two cases to consider:

1) Point $X_a$ belongs to a "blue" core sub-region. This could only be a sub-region of the $2^{nd}$ type, since any sub-region of the $1^{st}$ type cannot contain any approximately feasible points by definition. The sub-region of the $2^{nd}$ type consists of the points improved by a certain approximately feasible point, entering the Intermediate Set of Points $S_I$. This point in the process of analysis can be excluded from $S_I$, but in this case a new point is included in $S_I$, which substantially improves previous one. As a result, toward the end of analysis, all points of "blue" sub-region become improved by a point from $S_A$ or, which is the same thing at the end, by a point from $S_I$.

Thus, point $X_a$ from a "blue" sub-region improves by more than 2 tolerances point $X_0$ from $S_A$, and another point from $S_A$ improves point $X_a$. But any point from $S_A$ cannot improve another point from $S_A$ by more than to 1 improvement tolerances (see subsection A.6). So, there is a contradiction, which proves our hypothesis.

2) Point $X_a$ belongs to a "red" core sub-region. Suppose $X_b$ is the core point of this sub-region. Then the following conditions are satisfied (see system (A.1.5)):

$$|F_i(X_a)-F_i(X_b)|<\delta F_i, i=1,\ldots,m. \quad (A.6.1)$$

Thus $$F_i(X_b) \leq F_i(X_a)+\delta F_i \quad (A.6.2)$$

Point $X_b$ cannot substantially improve point $X_0$ by the definition of the approximating set $S_A$. It means that there is such a objective function $F_j(X)$, that the following inequalities are satisfied:

$$F_j(X_b)+\Delta F_j > F_j(X_0). \quad (A.6.3)$$

From (A.6.2) and (A.6.3):

$$F_j(X_a) \geq F_j(X_b)-\delta F_j > F_j(X_0)-\Delta F_j-\delta F_j > F_j(X_0)-2\cdot\Delta F_j \quad (A.6.4)$$

But by the assumption that the point $X_a$ improves point $X_0$ by more than 2 improvement tolerances the following inequality must be satisfied, which contradicts (A.6.4):

$$F_j(X_a)+2\cdot\Delta F_j \leq F_j(X^0) \quad (A.6.5)$$

Thus the statement formulated in topic A.6.3, is proven.

A.7. Conclusion

We have proven that by the end of the analysis process the Intermediate Set of Points $S_f$ possesses all the attributes 1)-3) of Numerical Solution with Pre-assigned Accuracy, section A.1. So, $S_f$ can be considered as the approximating set $S_A$ in the end.

Thus, TERM algorithm, based on the numerical analysis procedures described above and based on mathematically proven results, guarantees finding an approximation $S_A$ of Pareto frontier with pre-assigned accuracy.

We claim:

1. A computer system comprising:
a processor;
a display; and
a memory system, comprising instructions, which, when executed, cause the computer system to perform a multi-objective optimization method by optimizing objective functions in a multi-dimensional domain, the multi-objective optimization method comprising:
decomposing the multi-dimensional domain into a set of sub-regions;
selecting one or more prospective sub-regions by determining which sub-regions in the set of sub-regions contains at least one solution, wherein each prospective sub-region contains at least one solution;
selecting a first prospective sub-region;
selecting a current point within the selected first prospective sub-regions;
computing an additional point within the selected first prospective sub-region;
comparing the current point and the additional point, and selecting either the current point or the additional point as a first point-candidate for the selected first prospective sub-region;
selecting a second prospective sub-region;
selecting a second current point within the selected second prospective sub-region;
selecting a second additional point within the selected second prospective sub-region;
comparing the second current point and the second additional point, and selecting either the second current point or the second additional point as a second point-candidate for the selected second prospective sub-region;
comparing the point-candidates from at least the first and second sub-regions and selecting at least one of the point-candidates based on the comparison; and
outputting on the display, the selected point-candidate as a multi-objective optimization result.

2. The method system of claim 1 wherein the additional point within each sub-region is computed by a Decomposition Improvement search method.

3. The system of claim 1 wherein the additional point within each sub-region is computed by a Simplex Improvement search method.

4. The system of claim 1 wherein the additional point within each sub-region is computed by a Monte Carlo search method.

5. The system of claim 1 wherein the additional point within each sub-region is computed by a single-objective optimization search method that uses a scalarization technique, the search method comprising the steps of:
assigning boundaries of the current sub-region as limits for said single-objective optimization search method;
starting an iterative optimization process from the current point; and
computing the additional point based on the iterative optimization process.

6. The system of claim 1, wherein the additional point within each sub-region is computed by a Concurrent Gradients search method for multi-objective optimization of objective functions considered in a multi-dimensional domain, the search method comprising the steps of:
a) starting an optimization process from a current point and evaluating the objective functions on the current point;
b) determining a gradient on the current point for each objective function;
c) determining an area of simultaneous improvement of objective functions based on the gradients;
d) computing an additional point in the area of simultaneous improvement of objective functions and evaluating the objective functions on the additional point;
e) comparing the evaluations of the objective functions on the current point and on the additional point and selecting either the current point or the additional point as a next current point based on the comparison;
f) repeating steps a) through e) until the current point is selected in step e;
g) specifying the current point as a point-candidate.

7. A computer system, comprising:
a processor;
a display; and
a memory system, comprising instructions, which, when executed, cause the computer system to perform a Concurrent Gradients method for multi-objective optimization of objective functions in a multi-dimensional domain, the method comprising:
a) starting an optimization process from a current point and evaluating the objective functions on the current point;
b) determining a gradient on the current point for each objective function;
c) determining an area of simultaneous improvement of objective functions based on the gradients;
d) selecting an additional point in the area of simultaneous improvement of objective functions based on a point selection method, and evaluating the objective functions on the additional point;
e) comparing the evaluations of the objective functions on the current point and on the additional point and selecting either the current point or the additional point as a next current point based on the comparison;

f) repeating steps a) to e) on the next current point until the current point is selected in step e; and g) outputting on the display, the current point.

8. The system of claim 7 wherein the additional point is selected as the next current point as a result of the evaluation of the objective functions on the additional point being more optimal for at least one of the objective functions and not being less optimal for any of the objective functions.

9. The system of claim 7 wherein the additional point is selected as the next current point as a result of the evaluation of the objective functions on the additional point being more optimal for all of the objective functions except one and the evaluation of the one objective function being not less optimal.

10. The system of claim 7 wherein the additional point is selected as the next current point as a result of the evaluation of the objective functions on the additional point being more optimal for all of the objective functions.

11. The system of claim 7 wherein said point selection method comprises the steps of:
generating uniformly distributed points in the multi-dimensional domain;
determining whether each generated point is in the area of simultaneous improvement of objective functions; and
selecting a generated point which belongs to the area of simultaneous improvement of objective functions.

12. The system of claim 7 wherein said point selection method comprises the steps of:
determining a line which indicates a direction in the area of simultaneous improvement of objective functions;
calculating objective functions on first and second points along said line; and
comparing said calculated objective functions on the first and second points, and selecting the first or the second point based on the comparison.

13. The system of claim 7 wherein said point selection method comprises the steps of:
creating a sub-region around said current point based on a sub-region size determination method;
determining a line which indicates a direction in the area of simultaneous improvement of objective functions based on a method of a direction determination;
calculating the intersection point of the line and bounds of said sub-region, and selecting the intersection point for evaluating objective functions thereon.

14. The system of claim 13, wherein the sub-region is created based at least in part on a user specified tolerance of Pareto optimal solutions in terms of objective functions.

15. The system of claim 13 wherein the sub-region is created based at least in part on a user specified tolerance in terms of independent variables.

16. The system of claim 13 wherein said method of a direction determination comprises finding a middle direction in the area of simultaneous improvement of objective functions, wherein the middle direction substantially equally optimizes all objective functions.

17. The system of claim 13 wherein said method of a direction determination comprises finding a direction in the area of simultaneous improvement of objective functions that optimizes the objective functions with higher priority more than the objective functions having lower priority.

18. A computer system, comprising:
a processor;
a display; and
a memory system, comprising instructions, which, when executed, cause the computer system to perform a method of multi-objective optimization of objective functions in a multi-dimensional domain, the method comprising:
a) determining initial points based on a method of initial points determination;
b) selecting one of determined initial points as a current point and evaluating the objective functions on the current point;
c) starting an optimization process from said current point;
d) computing a gradient on the current point for each objective function by a method of gradients evaluation;
e) determining the area of simultaneous improvement of objective functions based on the gradients;
f) evaluating the objective functions on an additional point in the area of simultaneous improvement of objective functions;
g) comparing the evaluations of the objective functions on the current point and on the additional point and selecting either the current point or the additional point as a next current point based on the comparison;
h) repeating steps c) to g) on said next current point until the current point is selected in step g;
i) specifying the current points as a point-candidate;
j) repeating steps b) to i) for all the determined initial points, thereby selecting a point-candidate for each of the determined initial points;
k) comparing the point-candidate, and selecting at least one of the point-candidates based on the comparison; and
l) outputting the selected point-candidates on the display as a multi-objective optimization result.

19. The system of claim 18 wherein said method of initial points determination comprises a Decomposition method.

20. The system of claim 18 wherein said method of initial points determination generates a uniformly distributed sequence of initial points.

21. The system of claim 18 wherein the gradient on the current point for each objective function is determined based at least in part on calculated values of objective functions.

22. The system of claim 18 wherein the gradient on the current point for each objective function is determined based at least in part on a Response Surface method, which calculates local approximations of objective functions, and evaluates the gradients based on values of said local approximations.

* * * * *